US012766856B2

(12) United States Patent
Aruga et al.

(10) Patent No.: US 12,766,856 B2
(45) Date of Patent: Oct. 20, 2026

(54) RECORDING DEVICE

(71) Applicant: SEIKO EPSON CORPORATION, Tokyo (JP)

(72) Inventors: Sho Aruga, Chino (JP); Tomoya Kurashina, Shiojiri (JP); Haruki Miyasaka, Matsumoto (JP); Soshi Okawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 217 days.

(21) Appl. No.: 18/620,573

(22) Filed: Mar. 28, 2024

(65) Prior Publication Data

US 2024/0326465 A1 Oct. 3, 2024

(30) Foreign Application Priority Data

Mar. 30, 2023 (JP) ................................ 2023-054940

(51) Int. Cl.
*B41J 2/44* (2006.01)
*B41J 11/04* (2006.01)

(52) U.S. Cl.
CPC *B41J 2/44* (2013.01); *B41J 11/04* (2013.01)

(58) Field of Classification Search
CPC B41J 2/16585; B41J 2/16547; B41J 2/16511; B41J 2/16588; B41J 2/1721; B41J 2/16538; B41J 2/1742; B41J 11/007; B41J 11/0085; B41J 11/0065; B41J 11/04; B41J 11/06
See application file for complete search history.

(56) References Cited

U.S. PATENT DOCUMENTS 5,040,000 A * 8/1991 Yokoi .................. B41J 2/16547 347/30
5,051,761 A * 9/1991 Fisher .................. B41J 2/16585 347/30
6,578,945 B2 * 6/2003 Hashi .................. B41J 2/16588 347/22
6,866,361 B2 * 3/2005 Kuki .................... B41J 2/16535 347/22
7,654,664 B2 * 2/2010 Watanabe ............ B41J 11/0065 347/41
9,764,566 B2 * 9/2017 Besson ................ B41J 2/16585
(Continued)

FOREIGN PATENT DOCUMENTS

CN 1948018 4/2007
JP 2012-153132 A 8/2012

*Primary Examiner* — John P Zimmermann
(74) *Attorney, Agent, or Firm* — WORKMAN NYDEGGER

(57) ABSTRACT

A recording device includes: a liquid discharging head; an opposing section including an opening portion formed at a position that is opposed to the liquid discharging head; a cap section disposed at an inside of the opening portion; and a shutter configured to open and close the opening portion. The opening portion is formed so as to be opened alternately at an upstream position and a downstream position along a medium width direction so as to correspond to the arrangement of a plurality of head chips. The opposing section includes a support portion disposed between two head chips adjacent in the medium width direction and configured to be able to support the shutter disposed at the shielding position.

9 Claims, 35 Drawing Sheets

(56) References Cited

U.S. PATENT DOCUMENTS

| | | | | |
|---|---|---|---|---|
| 2007/0046757 | A1* | 3/2007 | Kim | B41J 11/06 347/104 |
| 2007/0085873 | A1 | 4/2007 | Jung | |
| 2008/0143806 | A1* | 6/2008 | Claeys | F26B 3/28 347/102 |
| 2012/0176445 | A1 | 7/2012 | Kataniwa | |
| 2015/0116422 | A1* | 4/2015 | Tanda | B41J 2/16547 347/29 |
| 2018/0207964 | A1* | 7/2018 | Hirashima | B41J 11/007 |

* cited by examiner

RECORDING DEVICE

The present application is based on, and claims priority from JP Application Serial Number 2023-054940, filed on Mar. 30, 2023, the disclosure of which is hereby incorporated by reference herein in its entirety.

BACKGROUND

1. Technical Field

The present disclosure relates to a recording device configured to perform recording on a medium.

2. Related Art

An inkjet printing apparatus described in JP-A-2012-153132 includes an inkjet head, and a nozzle cap used to cover a head surface of the inkjet head to keep the head surface in a moisturized state. The nozzle cap is accommodated in a nozzle-cap accommodating section. The nozzle-cap accommodating section includes an opening portion. This opening portion is shielded by a shutter. The shutter configured to shield the opening portion functions as a guide configured to guide a check. By using a driving mechanism, the shutter reciprocates between a shielding position at which the opening portion is shielded and a non-shielding position at which the opening portion is not shielded. When the shutter is disposed at the non-shielding position, the nozzle cap ascends, and is able to cover the head surface. Based on details disclosed in FIGS. 4 and 5 of JP-A-2012-153132, the opening portion seems to have a rectangular shape.

The inkjet printing apparatus described in JP-A-2012-153132 is configured as an apparatus that performs a printing process on a check, that is, is configured as a small-sized apparatus. Thus, the shutter hardly deforms when this shutter functions as a guide in a state in which the shutter covers the opening portion.

However, when an inkjet printer is configured so as to be able to perform printing on an A3-size sheet, an A4-size sheet, or the like, the size of the opening portion increases. This leads to a possibility that the shutter deforms so as to be dropped into the opening portion when the shutter functions as a guide. When the shutter functions as a guide, the medium is supported by the shutter. Thus, when the shutter is bent, a gap between the medium and the inkjet head becomes inappropriate. This leads to a possibility that desired recording quality cannot be obtained.

SUMMARY

A recording device according to the present disclosure configured to solve the problem described above includes a liquid discharging head configured to discharge a liquid to a medium to perform recording, an opposing section disposed opposed to the liquid discharging head and including an opening portion formed at a position opposed to the liquid discharging head, a cap section disposed at an inside of the opening portion and configured to cover a liquid discharging surface of the liquid discharging head, and a shutter configured to be displaced into a shielding position at which the opening portion is shielded and an open position at which the opening portion is opened, the shutter being configured to support a medium passing through a position opposed to the liquid discharging head when the shutter is disposed at the shielding position, in which the liquid discharging head includes a plurality of head chips including a nozzle configured to discharge a liquid, the head chips are arranged alternately at an upstream position and a downstream position along a medium width direction, the medium width direction being a direction intersecting a medium transport direction, the opening portion is formed opened alternately at an upstream position and a downstream position along the medium width direction and corresponding to the arrangement of the plurality of head chips, and the opposing section includes a support portion disposed between two of the plurality of head chips adjacent in the medium width direction and configured to support the shutter disposed at the shielding position.

DESCRIPTION OF EMBODIMENTS

Figure 1:
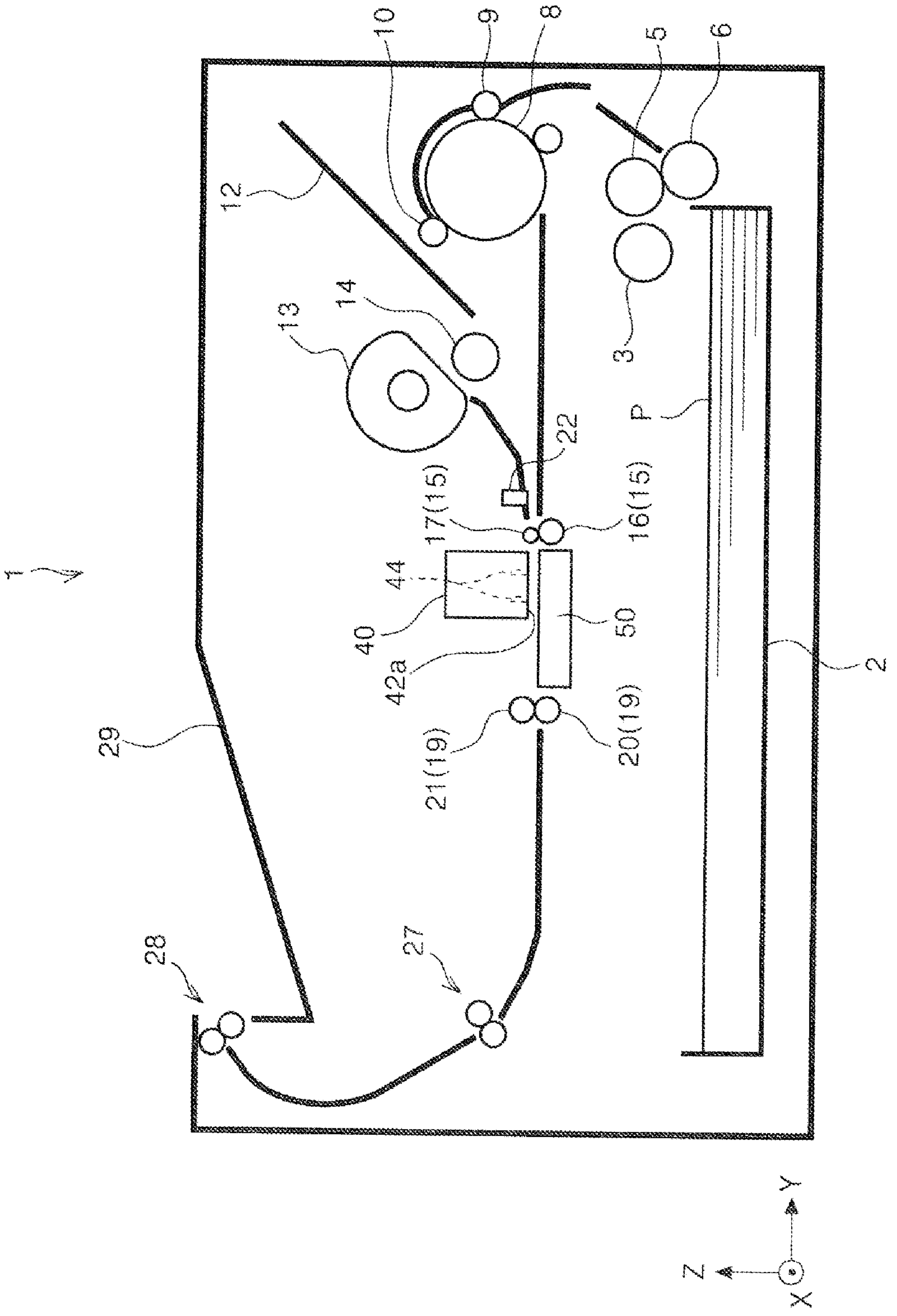
FIG. 1 is a diagram illustrating the whole of a medium transport path of a printer.

Below, the present disclosure will be schematically described.

A recording device according to a first aspect includes: a liquid discharging head configured to discharge a liquid to a medium to perform recording; an opposing section disposed opposed to the liquid discharging head and including an opening portion formed at a position opposed to the liquid discharging head; a cap section disposed at an inside of the opening portion and configured to cover a liquid discharging surface of the liquid discharging head; and a shutter configured to be displaced into a shielding position at which the opening portion is shielded and an open position at which the opening portion is opened, the shutter being configured to support a medium passing through a position opposed to the liquid discharging head when the shutter is disposed at the shielding position, in which the liquid discharging head includes a plurality of head chips including a nozzle configured to discharge a liquid, the head chips are arranged alternately at an upstream position and a downstream position along a medium width direction that is a direction intersecting a medium transport direction, the opening portion is formed opened alternately at an upstream position and a downstream position along the medium width direction and corresponding to the arrangement of the plurality of head chips, and the opposing section includes a support portion disposed between two of the plurality of head chips adjacent in the medium width direction and configured to support the shutter disposed at the shielding position.

With the present aspect, the opposing section includes a support portion disposed between two of the head chips adjacent in the medium width direction and configured to support the shutter disposed at the shielding position. This makes it possible to suppress bending of the shutter toward the inner side of the opening portion. Thus, it is possible to appropriately maintain a gap between the medium supported by the shutter and the liquid discharging head. This makes it possible to maintain appropriate recording quality.

A second aspect is an aspect dependent on the first aspect, and is configured such that the support portion includes: a first support portion extending from upstream toward downstream in the medium transport direction; and a second support portion extending from downstream toward upstream in the medium transport direction.

With the present aspect, the support portion includes: the first support portion extending from upstream toward downstream in the medium transport direction; and the second support portion extending from downstream toward upstream in the medium transport direction. This makes it possible to more appropriately support the shutter.

A third aspect is an aspect dependent on the second aspect, and is configured such that the opposing section includes the support portion between every two of the head chips adjacent in the medium width direction.

With the present aspect, the opposing section includes the support portion between every two of the head chips adjacent in the medium width direction. This makes it possible to appropriately support the shutter.

Note that it may be possible to apply the present aspect not only to the second aspect but also to the first aspect.

A fourth aspect is an aspect dependent on the second aspect, and is configured such that the open position of the shutter is disposed downstream of the shielding position in the medium transport direction, and a corner portion of the first support portion at a downstream end in the medium transport direction has a chamfered shape or a rounded shape.

With the present aspect, a corner portion of the first support portion at a downstream end in the medium transport direction has a chamfered shape or a rounded shape. This makes it possible to prevent the shutter from getting caught on the first support portion when the shutter moves in the upstream direction in the medium transport direction, that is, when the shutter moves from the open position toward the shielding position.

Note that it may be possible to apply the present aspect not only to the second aspect but also to the third aspect.

A fifth aspect is an aspect dependent on the first aspect, and is configured such that the shutter includes a plurality of first ribs extending in the medium transport direction and provided spaced apart from each other along a width direction intersecting the medium transport direction.

With the present aspect, the shutter includes a plurality of first ribs extending in the medium transport direction and provided so as to be spaced apart from each other along a width direction intersecting the medium transport direction. This makes it possible to reduce a contact area between a medium and the shutter, and also enables the shutter to smoothly guide the medium. In addition, with the first ribs, the rigidity of the shutter in the medium transport direction improves, which makes it possible to further suppress bending of the shutter.

Note that it may be possible to apply the present aspect not only to the first aspect but also to any one of the second to fourth aspects.

A sixth aspect is an aspect dependent on the fifth aspect, and is configured such that the opposing section includes a plurality of second ribs extending in the medium transport direction, provided upstream of the shutter in the medium transport direction, and spaced apart from each other along the width direction, and when the shutter is disposed at the shielding position, the plurality of first ribs and the plurality of second ribs are continuous with each other along the medium transport direction.

With the present aspect, the opposing section includes a plurality of second ribs extending in the medium transport direction and provided upstream, in the medium transport direction, of the shutter disposed at the shielding position, the plurality of second ribs being spaced apart from each other along the width direction, and when the shutter is disposed at the shielding position, the first ribs and the second ribs are continuous with each other along the medium transport direction. This makes it possible to further smoothly guide the medium.

In addition, in a case where the second ribs are provided at the shutter, the displacement necessary for the shutter to open the opening portion increases. Thus, it is necessary for a transport roller pair disposed downstream of the shutter to be disposed more downstream. In a case where the transport roller pair disposed downstream of the shutter is disposed more downstream, this increases a distance between the transport roller pair disposed upstream of the shutter and the transport roller pair disposed downstream of the shutter. This makes the posture of a medium more likely to be unstable at a position that is opposed to the liquid discharging head, which may lead to a deterioration of recording quality.

However, with the present aspect, as the second ribs are provided at the opposing section, it is possible to reduce the displacement necessary for the shutter to open the opening portion. This makes it possible to suppress a deterioration in the printing quality described above.

A seventh aspect is an aspect dependent on the sixth aspect, and is configured such that corner portions of the first ribs at an upstream end in the medium transport direction have a chamfered shape or a rounded shape.

With the present aspect, corner portions of the first ribs at an upstream end in the medium transport direction have a chamfered shape or a rounded shape. Thus, when the medium is transported in the downstream direction, it is possible to prevent the medium from getting caught on the first ribs.

An eighth aspect is an aspect dependent on the first aspect, and is configured such that the open position of the shutter is disposed downstream of the shielding position in the medium transport direction, a transport roller pair configured to transport the medium is provided downstream, in the medium transport direction, of a position opposed to the liquid discharging head, and the shutter disposed at the open position is disposed under the transport roller pair.

In a case where the shutter moves horizontally along the medium transport direction in a configuration in which the open position of the shutter is disposed downstream of the shielding position in the medium transport direction, the transport roller pair disposed downstream of the shutter needs to be disposed more downstream in order to avoid interference between the shutter and the transport roller pair disposed downstream of the shutter. In a case where the transport roller pair disposed downstream of the shutter is disposed more downstream, this increases a distance between the transport roller pair disposed upstream of the shutter and the transport roller pair disposed downstream of the shutter. This makes the posture of a medium more likely to be unstable at a position that is opposed to the liquid discharging head, which may lead to a deterioration of recording quality.

However, with the present aspect, as the shutter disposed at the open position is disposed under the transport roller pair, it is possible for the transport roller pair disposed downstream of the shutter to be disposed more upstream. This makes it possible to suppress a deterioration in the printing quality described above.

A ninth aspect is an aspect dependent on the eighth aspect, and is configured such that the transport roller pair includes: a driven roller configured to come into contact with a first surface of the medium opposed to the liquid discharging head; and a driving roller configured to come into contact with a second surface on an opposite side of the first surface.

Below, the present disclosure will be specifically described.

Below, an inkjet printer 1 will be described as one example of a recording device that performs recording on a medium. Below, the inkjet printer 1 is simply referred to as a printer 1.

Note that, in an X-Y-Z coordinate system illustrated in each of the drawings, an X-axis direction is a device width direction and is a width direction of a medium on which recording is performed. When the printer 1 is viewed from an operator, the +X direction is the left side, and the −X direction is the right side.

A Y-axis direction is a device depth direction, and is a direction extending along a medium transport direction at the time of performing recording. A +Y direction is a direction from the device back surface toward the front face, and a −Y direction is a direction from the device front face toward the back surface of the device. In the present embodiment, of side surfaces that constitute the circumference of the printer 1, a side surface at the +Y direction is the device front face, and a side surface at the −Y direction is the device back surface.

A Z-axis direction is a direction extending along a vertical direction, and is a device height direction. A +Z direction is the vertically upward direction, and a −Z direction is the vertically downward direction.

Note that, in the description below, a direction in which the medium is transported may be referred to as "downstream" and a direction opposite thereto may be referred to as "upstream".

Below, a medium transport path of the printer 1 will be described with reference to FIG. 1. As illustrated in FIG. 1, the printer 1 includes a medium accommodation cassette 2 serving as one example of a medium accommodation unit. A reference character P represents a medium accommodated in the medium accommodation cassette 2. One example of the medium includes a recording sheet. The medium accommodation cassette 2 is provided so as to be detached from the front side of the device.

A pick roller 3 driven by a motor (not illustrated) is provided above the medium accommodation cassette 2. The pick roller 3 is able to advance or retreat relative to the medium accommodated in the medium accommodation cassette 2, and rotates while being in contact with the medium accommodated in the medium accommodation cassette 2, thereby feeding the medium from the medium accommodation cassette 2 in the +Y direction.

A feeding roller 5 and a separation roller 6 are provided downstream of the medium accommodation cassette 2. The feeding roller 5 is driven by a motor (not illustrated). Rotational torque is applied to the separation roller 6 through a torque limiter (not illustrated). The medium that has been fed from the medium accommodation cassette 2 is nipped and separated by the feeding roller 5 and the separation roller 6, and is further transferred downstream.

An inverting roller 8 driven by a motor (not illustrated) is provided downstream of the feeding roller 5 and the separation roller 6. A first nip roller 9 and a second nip roller 10 are provided around the inverting roller 8. The medium is nipped by the inverting roller 8 and the first nip roller 9, and is further nipped by the inverting roller 8 and the second nip roller 10 to be transported. The transport direction of the medium is inverted by the inverting roller 8 from the +Y direction to the −Y direction, and the medium is transported downstream.

A first transport roller pair 15 is provided downstream of the inverting roller 8, and includes a driving roller 16 driven by a motor (not illustrated) and a driven roller 17 configured to be able to rotate in a following manner. The medium is transported by the first transport roller pair 15 to a position that is opposed to a line head 40.

Note that, in addition to the medium feeding path from the medium accommodation cassette 2, the printer 1 also includes a medium feeding path from a medium support portion 12. The medium support portion 12 is configured to support the medium at a sloped posture, and the supported medium is transported by a feeding roller 13 driven by a motor (not illustrated) to the first transport roller pair 15. The reference character 14 represents a separation roller to which rotational torque is applied through a torque limiter (not illustrated).

A medium detector 22 is provided upstream of the first transport roller pair 15. A control unit 80 (see FIG. 5), which will be described later, is configured to be able to position the position of the leading edge of the medium relative to the line head 40 based on information about detection by the medium detector 22, and for example, be able to position the medium at a recording starting position.

The line head 40 serves as one example of a liquid discharging head configured to discharge ink serving as one example of a liquid to perform recording. The line head 40 is a liquid discharging head in which a plurality of nozzles 44 configured to discharge ink are arrayed so as to cover the entire region in the medium width direction. The line head 40 is elongated in the medium width direction, and is configured as a liquid discharging head that is able to perform recording over the entire region in the medium width without involving movement in the medium width direction.

The reference character 42*a* represents a head surface serving as a surface that is opposed to the medium. The head surface 42*a* can also be referred to as a liquid discharging surface or a nozzle surface. The head surface 42*a* is comprised of a plate member 42 that will be described later.

The printer 1 includes an ink accommodation unit (not illustrated). Ink to be discharged from the line head 40 is supplied from the ink accommodation unit through an ink tube (not illustrated) to the line head 40.

An opposing section 50 is provided at a position that is opposed to the head surface 42*a* of the line head 40. The opposing section 50 according to the present embodiment includes a shutter 51 that will be described later, and is configured to support the medium with the shutter 51 to define a gap between the medium and the head surface 42*a*. Hereinafter, the gap between the medium and the head surface 42*a* may be referred to as a platen gap.

The line head 40 is provided so as to be able to move in a direction in which the line head 40 advances or retreats relative to the opposing section 50, that is, in a direction in which the platen gap is adjusted. In the present embodiment, the direction in which the platen gap is adjusted is parallel to the Z-axis direction. Hereinbelow, movement of the line head 40 to the +Z-axis direction may be referred to as "move upward", and movement of the line head 40 to the −Z direction may be referred to as "move downward".

Figure 5:
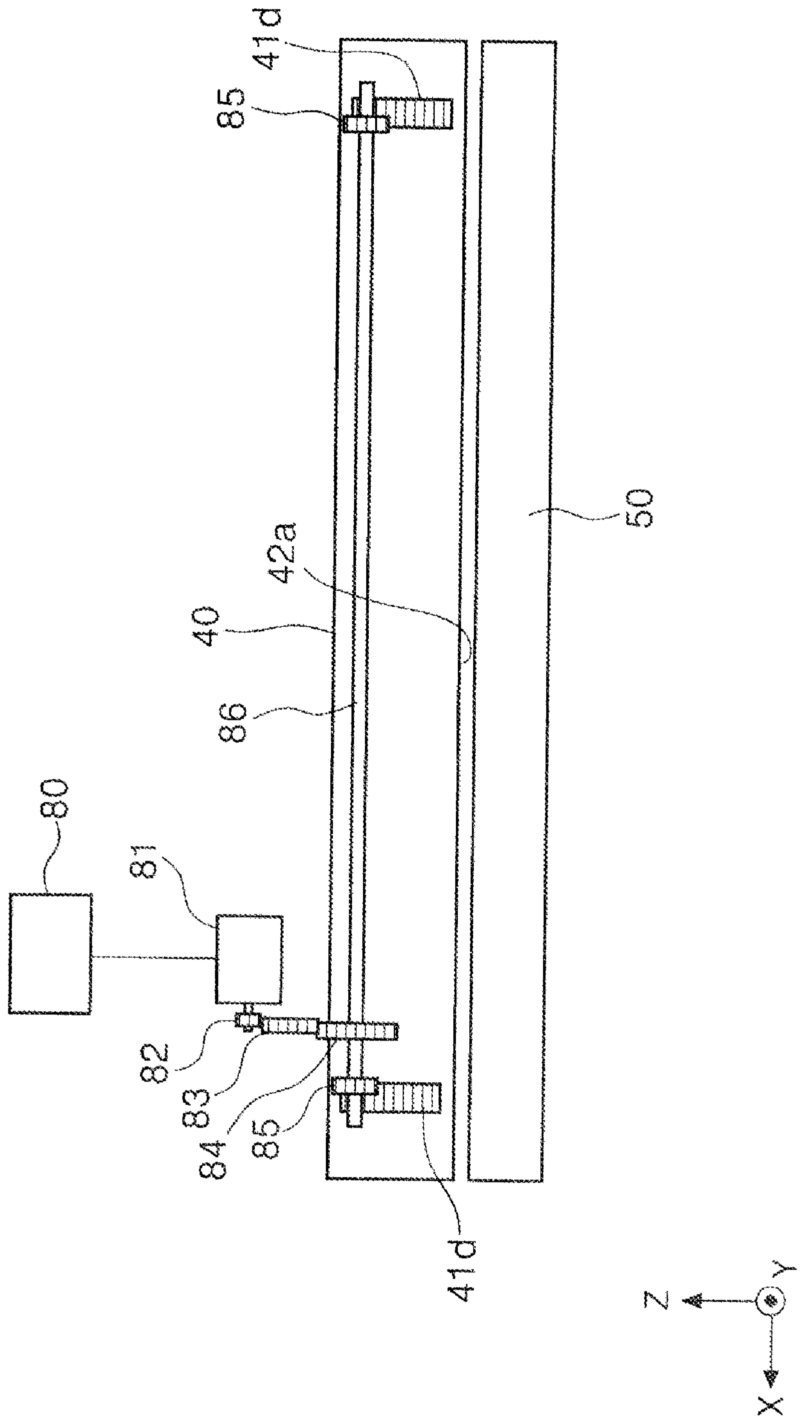
FIG. 5 is a diagram illustrating a driving mechanism configured to drive a line head.

FIG. 5 illustrates a mechanism of adjusting the platen gap. The reference character 81 represents a head moving motor serving as a driving source used to move the line head 40 upward and downward. The reference character 80 represents a control unit configured to control the head moving motor 81. The control unit 80 is a control unit that is responsible for controlling the entire printer 1.

A motor toothed gear 82 is provided at a motor shaft of the head moving motor 81. The motor toothed gear 82 transmits driving force to the pinion toothed gear 85 through the toothed gear 83. The pinion toothed gear 85 is fixed to a shaft 86.

The line head 40 is held by a guide member (not illustrated) so as to be able to be displaced in the Z-axis direction. A rack portion 41*d* is formed along Z-axis direction at the line head 40, and the pinion toothed gear 85 meshes with the rack portion 41*d* to constitute a rack and pinion mechanism.

The pinion toothed gear 85 is provided at the shaft 86. With rotation of the head moving motor 81, the pinion toothed gear 85 rotates. This makes the line head 40 move upward and downward.

Note that the rack and pinion mechanism that includes the rack portion 41*d* and the pinion toothed gear 85 is provided at and around both end portions of the line head 40 in the medium width direction.

When moving upward, the line head 40 comes into contact with an ascending restriction unit (not illustrated), and further upward movement is restricted. The control unit 80 detect an increase in the electric current value concerning driving the motor when the line head 40 comes into contact with the ascending restriction unit, thereby being able to determine that the line head 40 is disposed at an ascending limit position.

In addition, an encoder sensor (not illustrated) is provided at the head moving motor 81, and this enables the control unit 80 to detect the amount of rotation of the head moving motor 81. With this configuration, the control unit 80 is able to detect the displacement of the line head 40 from the ascending limit position, that is, is able to determine the current position of the line head 40.

The control unit 80 causes the line head 40 to move upward in accordance with the thickness of the medium based on a type of the medium included in received print data, thereby adjusting the platen gap. For example, on the assumption that a first recording position is the position of the line head 40 when recording is performed on ordinary paper, when recording is performed on a dedicated sheet having a thickness thicker than the ordinary paper, the line head 40 is positioned at a second recording position that is higher than the first recording position.

Note that, in addition to the plurality of recording positions described above, the movement region of the line head 40 includes a wiping position at which wiping is performed to the head surface 42*a* by a wiper 36 that will be described later.

In the present embodiment, the individual positions of the line head 40 that have been described above are a first recording position, a second recording position, and a wiping position sequentially toward the +Z direction.

Returned to FIG. 1, a second transport roller pair 19 is provided downstream of the line head 40. The second transport roller pair 19 includes a driving roller 20 driven by a motor (not illustrated) and a driven roller 21 configured to be able to rotate in a following manner. The medium on which recording has been performed is transferred downstream by the second transport roller pair 19.

A third transport roller pair 27 is provided downstream of the second transport roller pair 19. In addition, an ejection roller pair 28 is provided downstream of the third transport roller pair 27. A portion between the third transport roller pair 27 and the ejection roller pair 28 is configured as a face-down ejection path, and the medium on which recording has been performed is ejected by the ejection roller pair 28 to an ejection tray 29 with the latest recording surface facing downward.

Next, with reference to FIG. 2 and thereafter, description will be made of a cover cap section 61 configured to cover a head chip 43 of the line head 40. The head chip 43 is provided at the head surface 42*a*, and hence, the cap section 61 can also be referred to as a covering member configured to cover a portion of the head surface 42*a*. In addition, the nozzles 44 are provided at the head chip 43, and hence, the cap section 61 can also be referred to as a covering member configured to cover the nozzles 44. The head chip 43 will be described later again.

Figure 2:
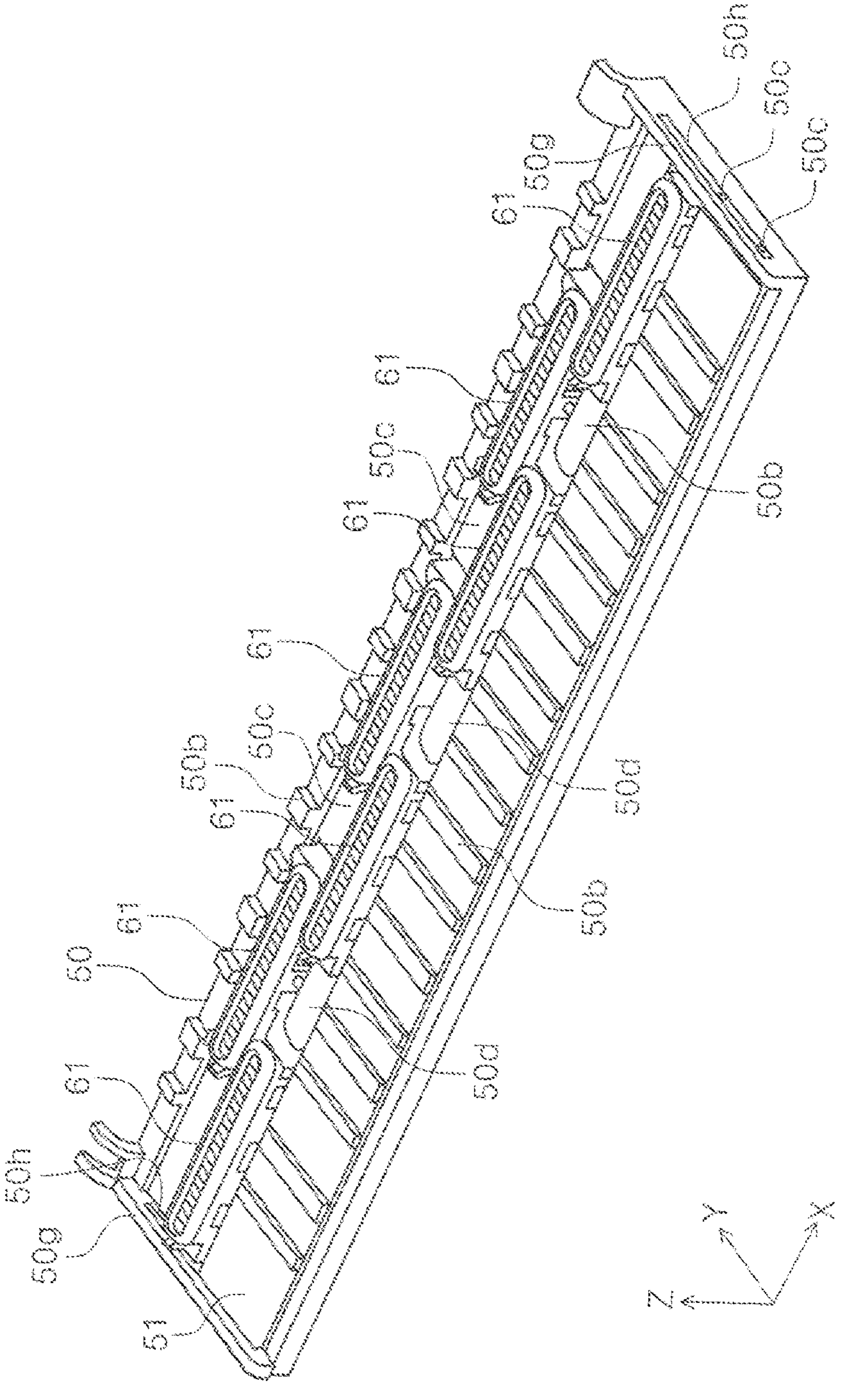
FIG. 2 is a perspective view illustrating an opposing section and cap sections in a state in which a shutter is disposed at an open position and the cap sections are disposed in a capping position.

As illustrated in FIG. 2, an opening portion 50*a* is formed in the opposing section 50. In addition, a plurality of cap sections 61 are provided at the inside of the opening portion 50*a*.

Figure 4:
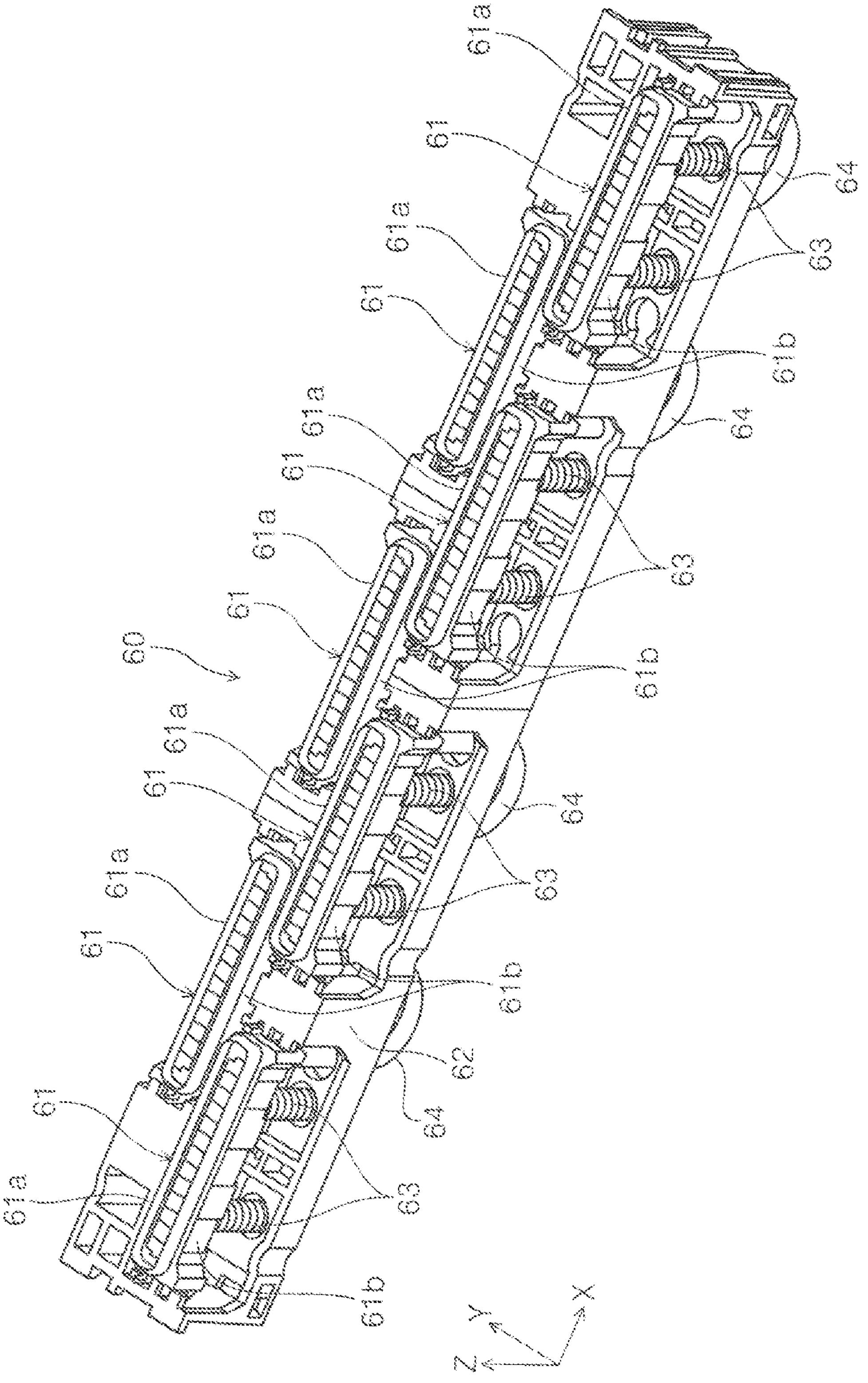
FIG. 4 is a perspective view of a cap unit.

FIG. 4 is a perspective view illustrating the cap unit 60 including the cap sections 61. The cap unit 60 is configured to include the cap sections 61 at a base portion 62.

The cap sections 61 have a shape elongated in the X-axis direction, and each include a cap main-body section 61*b* made of a resin material or the like, and an elastic portion 61*a* coming into contact with the head surface 42*a* and made of an elastic material such as rubber. The cap main-body section 61*b* is held by a guide section (not illustrated) formed at the base portion 62, so as to be displaced in the Z-axis direction, and a movement limit of the cap main-body section 61*b* to the +Z direction is defined by a restriction unit (not illustrated) formed at the base portion 62. The cap main-body section 61*b* is pressed in the +Z direction by a cap spring 63 serving as one example of a pressing member. In the present embodiment, two cap springs 63 are provided for one cap main-body section 61*b*.

A waste-liquid tube 64 is coupled to each of the cap main-body sections 61*b*. The waste-liquid tube 64 is coupled to a pump (not illustrated). When the pump is activated in a state in which the cap section 61 covers the head surface 42*a*, negative pressure occurs within the cap section 61. This causes ink to be suctioned from the nozzle 44 of the line head 40.

The cap sections 61 are arranged alternately at an upstream position and a downstream position along the X-axis direction, that is, along the medium width direction. In the present embodiment, three cap sections 61 are provided at the upstream position, that is, at the +Y direction, and four cap sections 61 are provided at the downstream position, that is, at the −Y direction.

Such arrangement of cap sections 61 corresponds to the arrangement of the head chips 43 at the line head 40.

Figure 7:
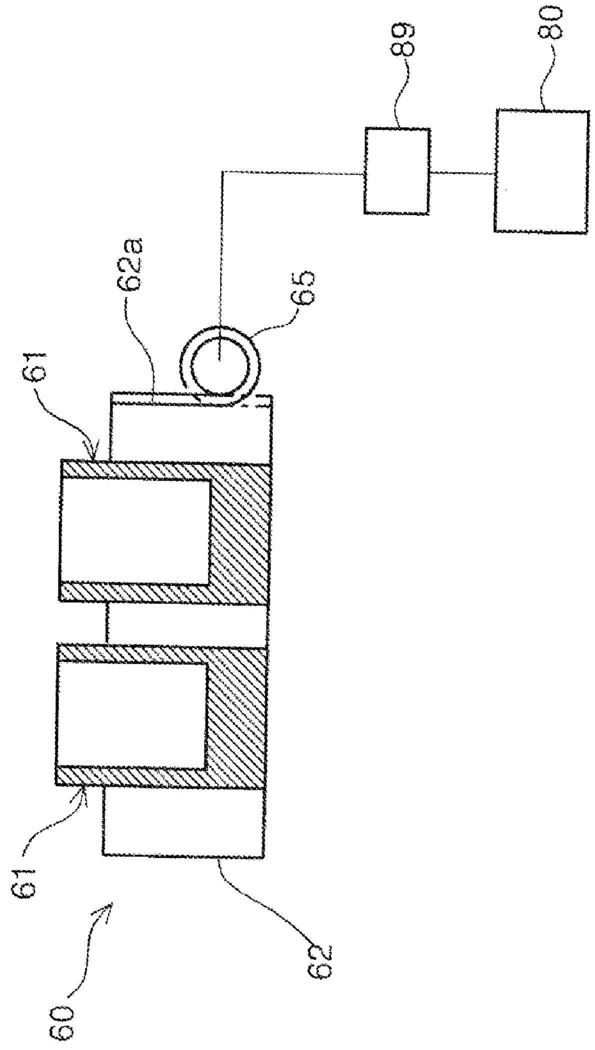
FIG. 7 is a diagram illustrating a driving mechanism configured to drive the cap section.

The base portion 62 is held by a guide member (not illustrated) so as to be able to be displaced in the Z-axis direction. As illustrated in FIG. 7, a rack portion 62*a* is formed along the Z-axis direction at the base portion 62, and a pinion toothed gear 65 meshes with the rack portion 62*a* to constitute a rack and pinion mechanism.

With rotation of a cap driving motor 89, the pinion toothed gear 65 is driven. This makes the cap unit 60 move upward and downward.

When the cap unit 60 moves upward, the cap section 61 comes into contact with the head surface 42*a* of the line head 40 to cover the nozzle 44. This position is referred to as a capping position of the cap unit 60. When the cap unit 60 moves to the capping position, the cap section 61 resists against pressing force of the cap spring 63, and is slightly pressed downward in the −Z direction. This causes the elastic portion 61*a* to come into contact with the head surface 42*a*. Note that, when the cap section 61 comes into contact with the head surface 42*a* of the line head 40 to cover the nozzle 44, the line head 40 is positioned at the lowest position of a plurality of recording positions as one example.

With the cap unit 60 moving upward and downward, the cap unit 60 is displaced to the capping position and the descending position. When the cap unit 60 is disposed at the descending position, the cap section 61 is in a state in which the cap section 61 does not protrude from an opposing section 50 that will be described later (state in FIG. 12).

Note that, when the cap unit 60 is disposed at the descending position, the cap unit 60 comes into contact with a descending restriction unit (not illustrated), and further downward movement is restricted. The control unit 80 detects an increase in the electric current value concerning driving the motor when the cap unit 60 comes into contact with the descending restriction unit, thereby being able to determine that the cap unit 60 is disposed at the descending position.

Furthermore, an encoder sensor (not illustrated) is provided at the cap driving motor 89, and this enables the control unit 80 to detect the amount of rotation of the cap driving motor 89. With this configuration, the control unit 80 is able to detect the displacement of the cap unit 60 from the descending position, that is, is able to determine the current position of the cap unit 60.

Note that, in place of the motor driving as described above, it may be possible to employ a configuration in which the cap unit 60 moves upward and downward with an actuator such as a solenoid.

The control unit 80 causes the cap unit 60 to be disposed at the capping position in a recording stand-by state at the time of turning off the device or turning on the device. When receiving recording data to perform recording, the control unit 80 causes the cap unit 60 to move from the capping position to the descending position.

In addition, the control unit 80 causes the shutter 51 that will be described later to open and close when the cap unit 60 moves upward and downward, which will be described later.

Figure 6:
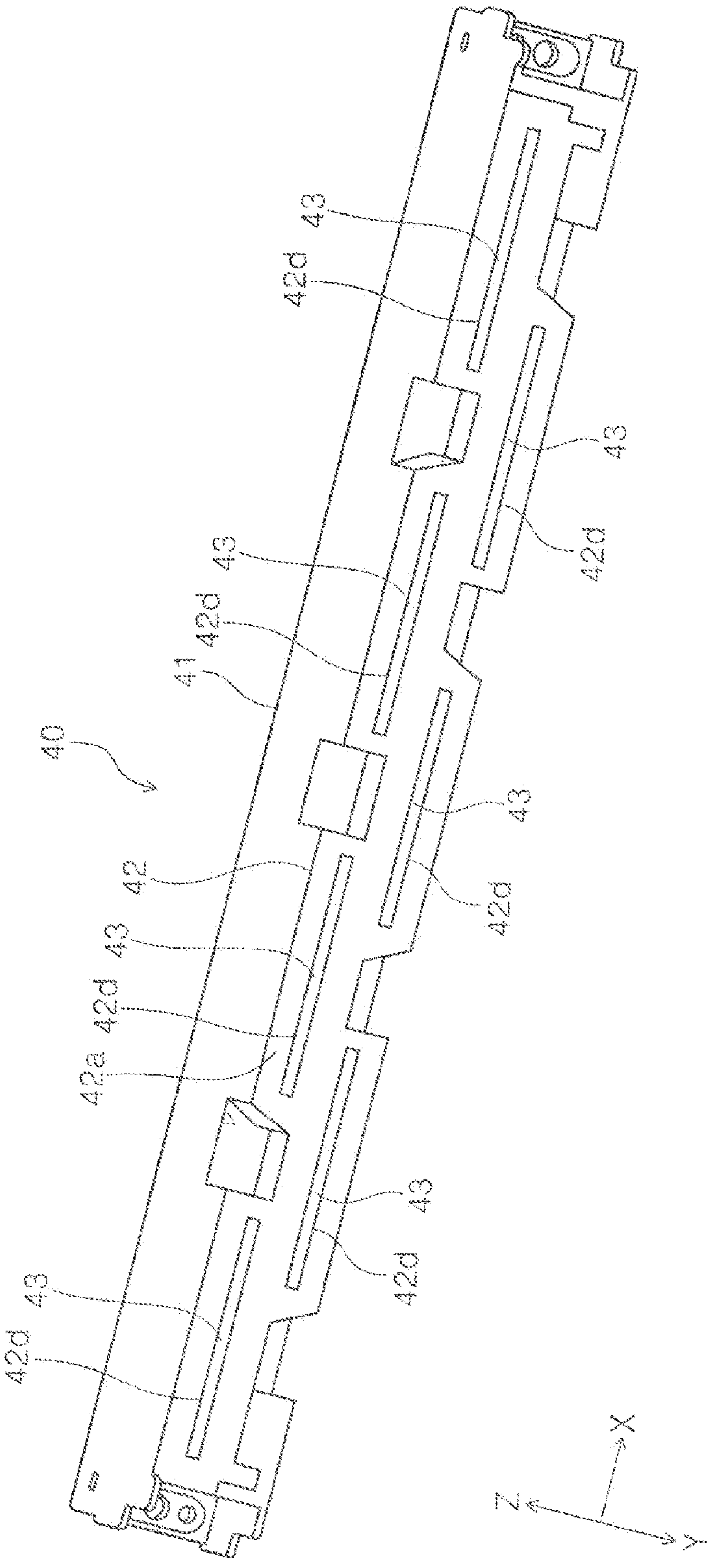
FIG. 6 is a perspective view illustrating the line head.

Next, FIG. 6 illustrates the configuration of the external appearance of the line head 40. The line head 40 includes the plate member 42 at the base 41 as illustrated in the drawing.

The base 41 is a structural body including, therein, a flow path used to supply the head chip 43 with ink supplied from an ink accommodation unit (not illustrated).

The plate member 42 is a metal plate, and constitutes the head surface 42*a*.

A plurality of opening portions 42*d* are formed in the plate member 42, and the head chip 43 is provided for each of the opening portions 42*d*. At the head chip 43, a plurality of nozzles 44 (see FIG. 1) are provided along the medium width direction. The plate member 42 and the head chip 43 are provided so as to be flush with each other.

The head chips 43 are arranged alternately at an upstream position and a downstream position along the X-axis direction, that is, along the medium width direction. In the present embodiment, three head chips 43 are provided at the upstream position and along the medium width direction, and four head chips 43 are provided at the downstream position and along the medium width direction. With this configuration, the cap sections 61 configured to cover the head chips 43 are arranged alternately at an upstream position and a downstream position along the medium width direction as described with reference to FIG. 4.

The head chip 43 has a shape elongated in the medium width direction, and includes a plurality of nozzles 44 (see FIG. 1) along the medium width direction.

Next, the wiper 36 will be described.

Figure 3:
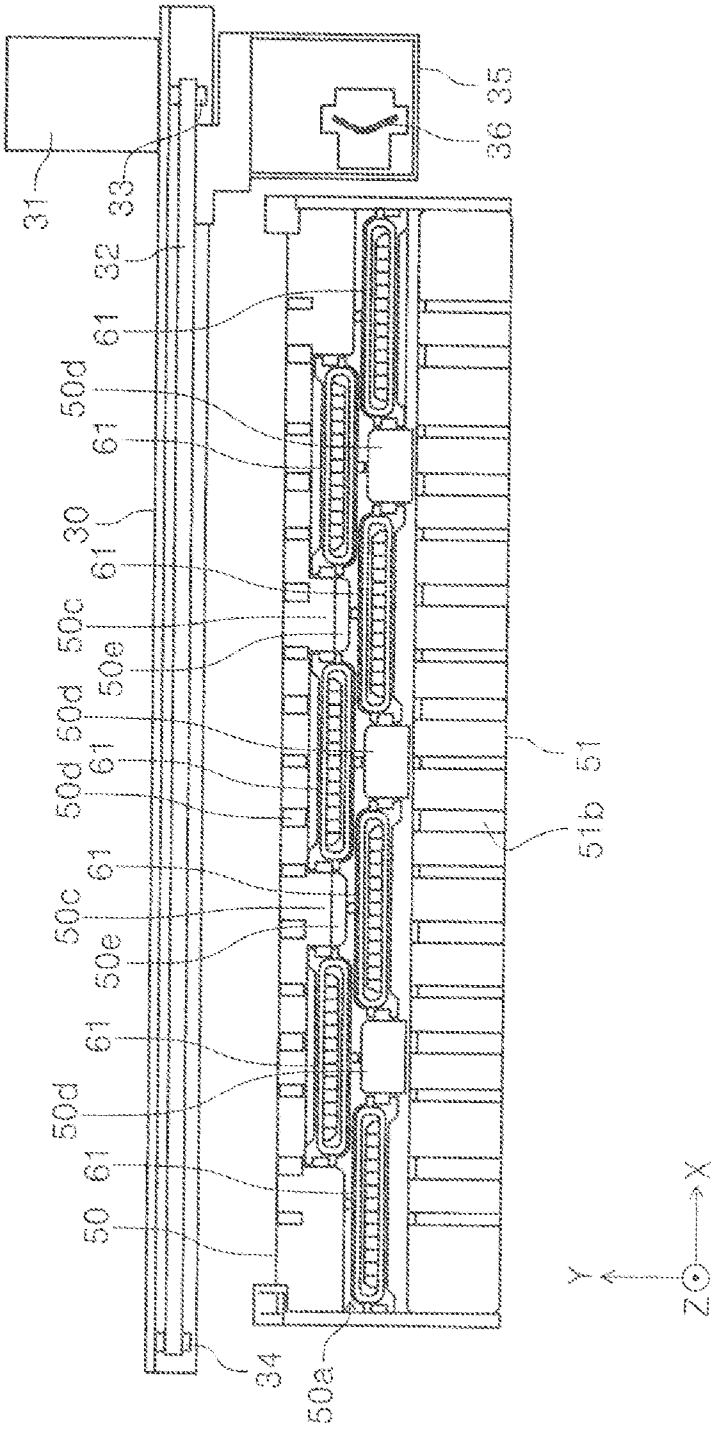
FIG. 3 is a plan view illustrating the opposing section and cap sections in a state in which the shutter is disposed at the open position and the cap sections are disposed at the capping position.

As illustrated in FIG. 3, the printer 1 includes a wiper frame 30 extending along the medium width direction. A wiper driving motor 31 is provided at an end portion of the wiper frame 30 in the +X direction. A drive pulley 33 is provided at a motor shaft of the wiper driving motor 31. In addition, a driven pulley 34 is provided at an end portion of the wiper frame 30 in the −X direction. An endless belt 32 is looped over the drive pulley 33 and the driven pulley 34. A wiper carriage 35 is fixed at a portion of the endless belt 32. As the endless belt 32 circulates with rotation of the wiper driving motor 31, the wiper carriage 35 moves along the X-axis direction.

In the present embodiment, a home position of the wiper carriage 35 is set to a position in FIG. 3, that is, a position at an end portion thereof at the +X direction. At the time of turning off the device or in a recording stand-by state, the wiper carriage 35 is positioned at the home position.

When moving from the end portion in the −X direction to the +X direction and being positioned at the home position, the wiper carriage 35 comes into contact with a movement restriction unit (not illustrated), and further movement toward the +X direction is restricted. The control unit 80 detects an increase in the electric current value concerning driving the motor when the wiper carriage 35 comes into contact with the movement restriction unit, thereby being able to determine that the wiper carriage 35 is disposed at the home position.

Furthermore, an encoder sensor (not illustrated) is provided at the wiper driving motor 31, and this enables the control unit 80 to detect the amount of rotation of the wiper driving motor 31. With this configuration, the control unit 80 is able to detect the displacement of the wiper carriage 35 from the home position, that is, is able to determine the current position of the wiper carriage 35.

The wiper 36 is provided at the wiper carriage 35. The wiper 36 is made of an elastic material such as rubber. The wiper carriage 35 moves in the medium width direction in a state in which the wiper 36 comes into contact with the head surface 42*a* in an elastic manner, to wipe, particularly the head chip 43 of the head surface 42*a*. Ink removed through the wiping is stored within the wiper carriage 35.

Note that it may be possible to employ a configuration in which the wiper carriage 35 has a box shape with the upper portion thereof being opened or a configuration in which the wiper carriage 35 has a semi-closed shape with only a portion for the wiper 36 being opened.

Figure 8:
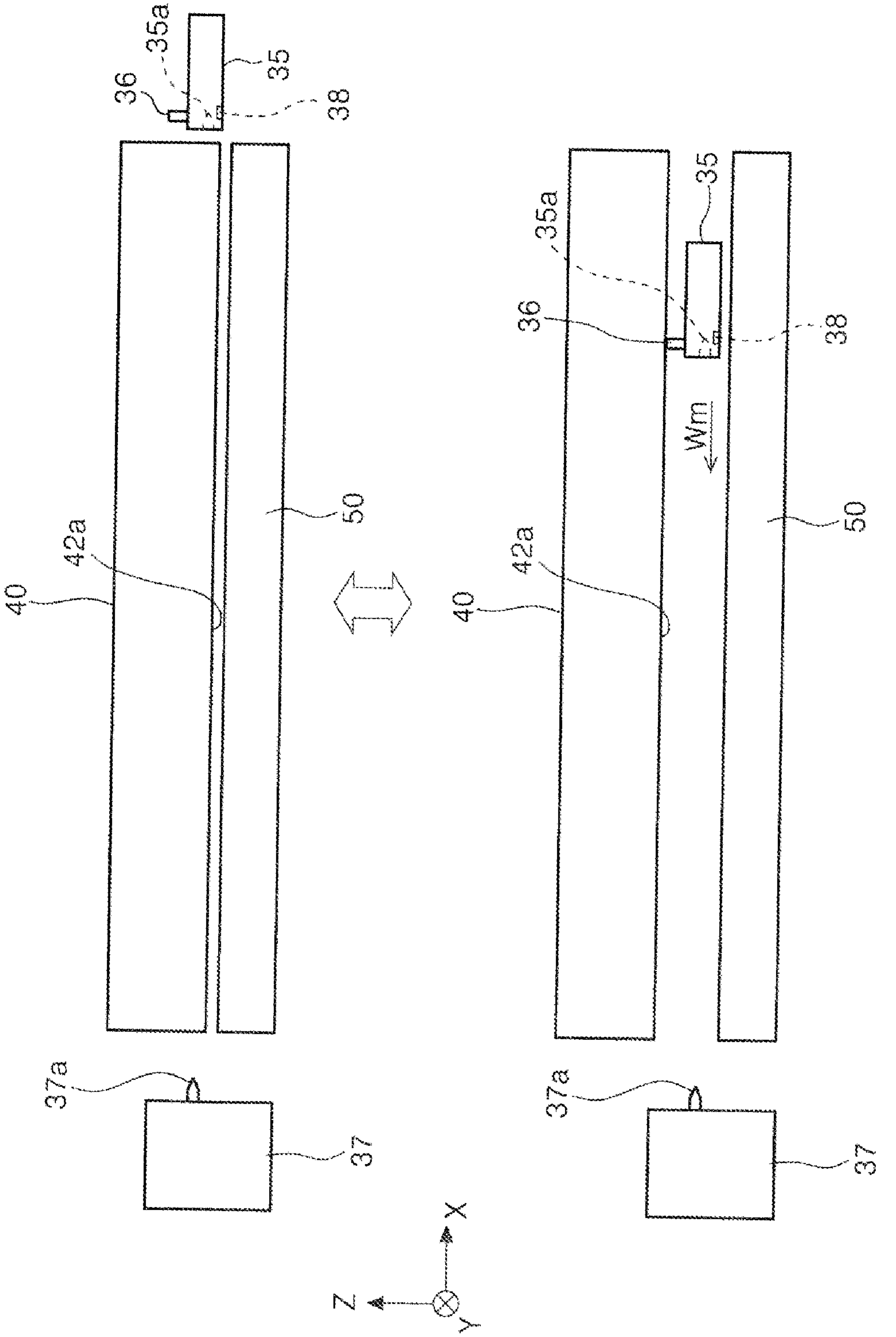
FIG. 8 is a diagram illustrating transition of operations when the line head moves between a recording position and a wiping position.

FIG. 8 illustrates movement of the line head 40 when the head surface 42*a* is wiped by the wiper 36. The upper diagram in FIG. 8 illustrates a state in which the line head 40 is disposed at the recording position. From this state, at the time of wiping the head surface 42*a* by the wiper 36, the line head 40 is moved upward to the wiping position as indicated in the transition from the upper diagram in FIG. 8 to the lower diagram. This movement creates a space between the line head 40 and the opposing section 50 into which the wiper carriage 35 enters, and enables the wiper 36 to come into contact with the head surface 42*a*.

In this state, by moving the wiper carriage 35 as indicated by the arrow Wm, the wiper 36 wipes the head surface 42*a*.

Note that, when the wiper 36 moves to an end portion in the −X direction, that is, when the wiper 36 wipes the head surface 42*a*, the wiper carriage 35 moves in the +X direction in order to return to the home position at the end portion in the +X direction. It may be possible to employ a configuration in which, prior to this operation, the line head 40 is slightly moved upward such that the wiper 36 is not in contact with the head surface 42*a*.

A fitting hole 35*a* is provided at an end portion of the wiper carriage 35 in the −X direction as illustrated in FIG. 8. The fitting hole 35*a* is provided with a check valve (not illustrated), and is configured such that the check valve prevents the ink stored in the wiper carriage 35 from leaking out.

An ink collection unit 37 is provided at an end portion, at the −X direction, of a movement region of the wiper carriage 35. The ink collection unit 37 includes a suction unit 37*a*. The suction unit 37*a* is configured so as to be able to be fitted into the fitting hole 35*a* of the wiper carriage 35. As the wiper carriage 35 moves to the end portion in the −X direction, the suction unit 37*a* is fitted into the fitting hole 35*a*. When the suction unit 37*a* is fitted into the fitting hole 35*a*, the check valve opens. In this state, a pump (not illustrated) provided at the ink collection unit 37 is actuated, which causes the ink stored in the wiper carriage 35 to be suctioned. As one example, ink is suctioned by the ink collection unit 37 at the time of turning on the device or when the number of times of wiping of the head surface 42*a* by the wiper 36 reaches a predetermined number of times.

Note that, in place of being provided at the end portion in the −X direction, the ink collection unit 37 may be provided at the end portion in the +X direction, that is, at the home position side of the wiper carriage 35. In addition, in this case, it may be possible to employ a configuration in which, when the wiper carriage 35 is disposed at the home position, the suction unit 37*a* is fitted into the fitting hole 35*a*.

Next, the opposing section 50 will be described.

Figure 9:
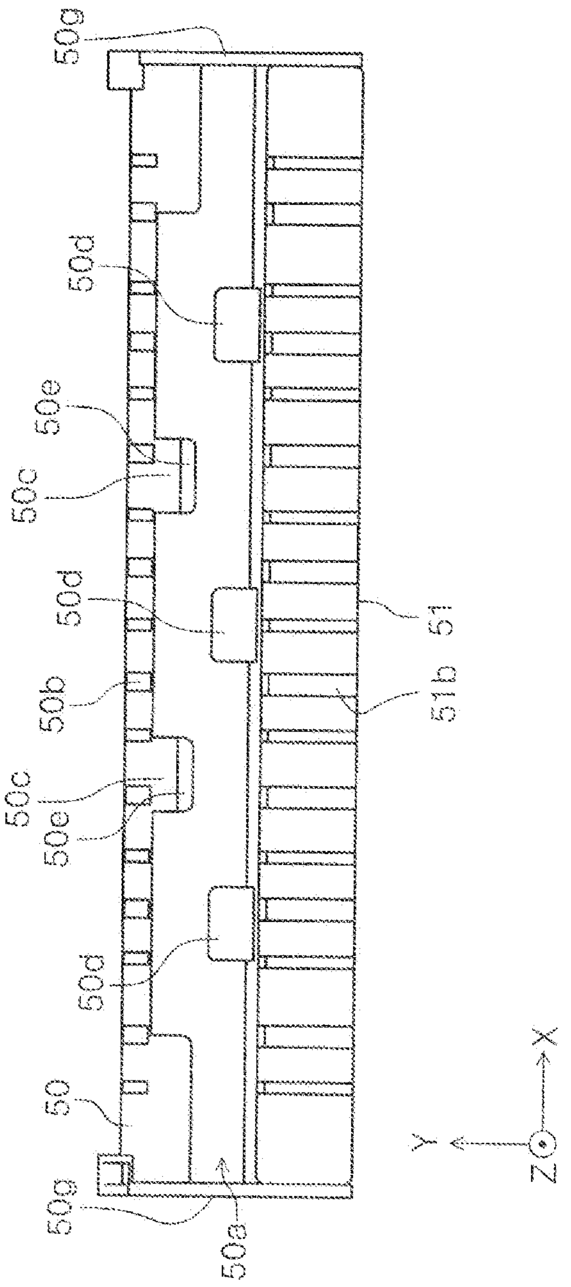
FIG. 9 is a plan view illustrating the opposing section in a state in which the shutter is disposed at the open position.

The opposing section 50 includes a plurality of second ribs 50*b* extending in the Y-axis direction, that is, in the medium transport direction and formed along the medium width direction so as to be spaced apart from each other as appropriate, as illustrated in FIGS. 2, 3 and 9.

In addition, the opening portion 50*a* is formed in the opposing section 50, and the cap sections 61 are provided at the inside of the opening portion 50*a*.

The opening portion 50*a* is formed so as to be opened alternately at an upstream position and a downstream position along the medium width direction so as to correspond to the arrangement of the plurality of the head chips 43, in other words, so as to correspond to the arrangement of the plurality of cap sections 61.

With the opening portion 50*a* being formed in this manner, the opposing section 50 includes support portions indicated as reference characters 50*c* and 50*d* and formed between two cap sections 61 adjacent in the medium width direction. Hereinbelow, a support portion indicated as the reference character 50*c* is referred to as a first support portion 50*c*, and a support portion indicated as the reference character 50*d* is referred to as a second support portion 50*d*.

The first support portion 50*c* extends downstream from an upstream end of the opening portion 50*a*, and a chamfered section 50*e* is formed at a corner portion thereof at a downstream end (see FIG. 3). In addition, the second support portion 50*d* extends upstream from a downstream end of the opening portion 50*a*.

The chamfered section 50*e* enables a shutter 51, which will be described later, to be prevented from getting caught on the first support portion 50*c* when the shutter 51 moves from the open position to the shielding position.

Note that the chamfered section 50*e* may be formed into a rounded shape rather than the chamfered shape.

The opposing section 50 is supported at both end portions in the medium width direction by a main frame (not illustrated) that constitutes a base of the printer 1.

Next, the shutter 51 will be described.

The shutter 51 is provided at the opposing section 50, as illustrated in FIGS. 2, 3 and 9. Note that FIGS. 2 and 3 illustrate a state in which the shutter 51 is disposed at the open position, and the cap unit 60 is disposed at the capping position. In addition, FIG. 9 is a diagram only illustrating the opposing section 50 and the shutter 51, and illustrates a state in which the shutter 51 is disposed at the open position.

The shutter 51 is provided so as to be able to slide along the medium transport direction and between guide sections 50*g* provided at both end portions of the opposing section 50 in the medium width direction.

Bosses 51*c* are provided at both end portions of the shutter 51 in the medium width direction so as to be spaced apart from each other in the medium transport direction. A guide hole 50*h* is formed in the guide section 50*g* so as to be parallel along the medium transport direction, and the bosses 51*c* are inserted into the guide hole 50*h*. With this configuration, the shutter 51 is guided in the medium transport direction, and the movement limit in the +Y direction, that is, toward the upstream direction and the movement limit in the −Y direction, that is, toward the downward direction are defined.

The shutter 51 includes a plurality of first ribs 51*b* extending in the Y-axis direction, that is, in the medium transport direction so as to be appropriately spaced apart from each other along the medium width direction. The first ribs 51*b* together with the second ribs 50*b* formed at the opposing section 50 support the medium.

Figure 10:
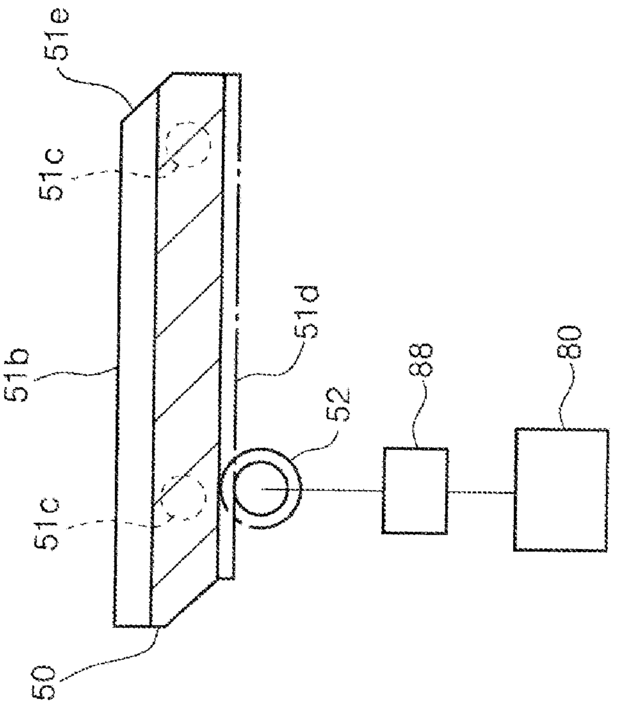
FIG. 10 is a diagram illustrating a driving mechanism configured to drive the shutter.

As illustrated in FIG. 10, a rack portion 51*d* is formed along the medium transport direction at the shutter 51, and a pinion toothed gear 52 meshes with the rack portion 51*d* to constitute a rack and pinion mechanism. With power of a shutter driving motor 88, the pinion toothed gear 52 rotates. This causes the shutter 51 to slide and be displaced.

Note that the rack and pinion mechanism that includes the rack portion 51*d* and the pinion toothed gear 52 is provided at and around both end portions of the shutter 51 in the medium width direction.

When the shutter 51 moves from the open position to the shielding position (see FIGS. 13 and 14), the boss 51*c* comes into contact with an end portion of the guide hole 50*h* in the +Y direction, and further movement is restricted. The control unit 80 detects an increase in the electric current value concerning driving the motor when the boss 51*c* comes into contact with an end portion of the guide hole 50*h* in the +Y direction, thereby being able to determine that the shutter 51 is disposed at the shielding position. Similarly, when the shutter 51 moves from the shielding position to the open position, the boss 51*c* comes into contact with an end portion of the guide hole 50*h* in the −Y direction, and further movement is restricted. The control unit 80 detects an increase in the electric current value concerning driving the motor when the boss 51*c* comes into contact with an end portion of the guide hole 50*h* in the −Y direction, thereby being able to determine that the shutter 51 is disposed at the open position.

Figure 11:
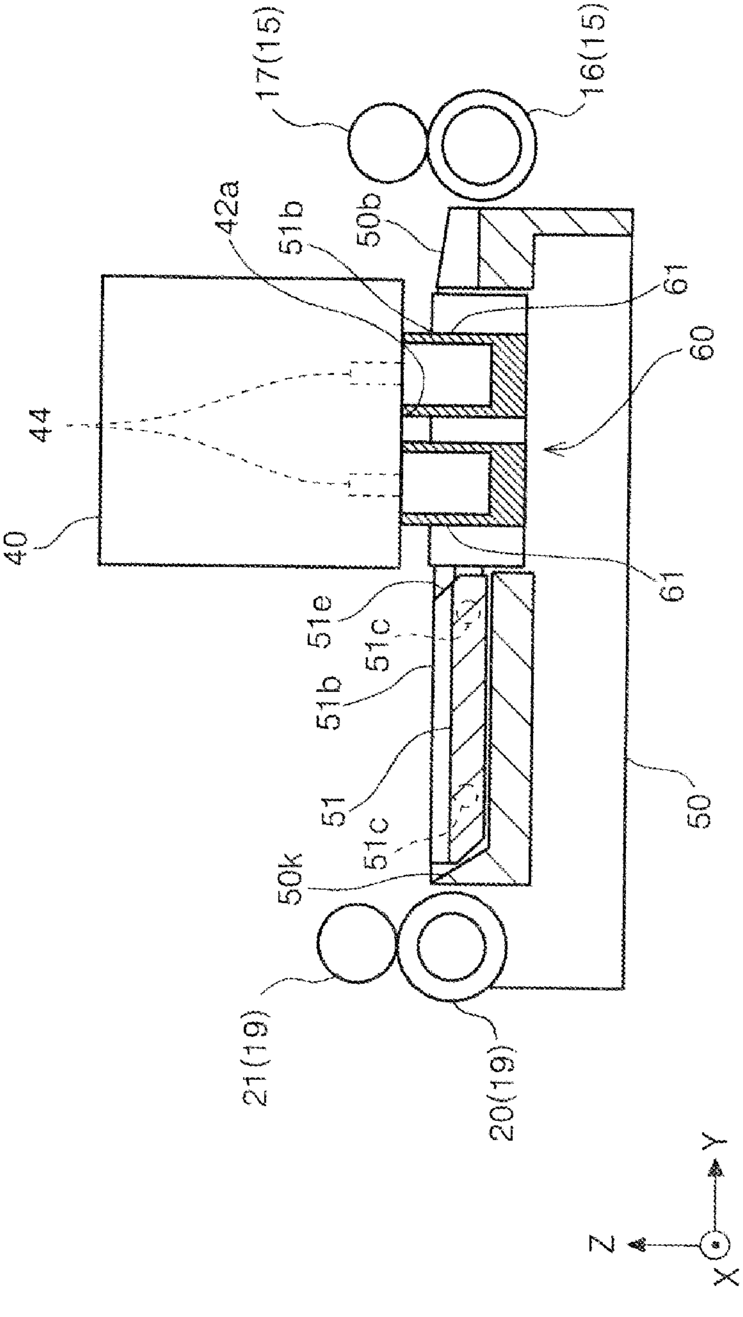
FIG. 11 is a cross-sectional view illustrating the opposing section and the cap sections in a state in which the shutter is disposed at the open position and the cap sections are disposed at the capping position.

FIG. 11 illustrates a state in which the cap unit 60 is disposed at the capping position and the shutter 51 is disposed at the open position. In the recording stand-by state at the time of turning off the device or turning on the device, the control unit 80 turns the cap unit 60 and the shutter 51 into the state illustrated in FIG. 11.

Figure 12:
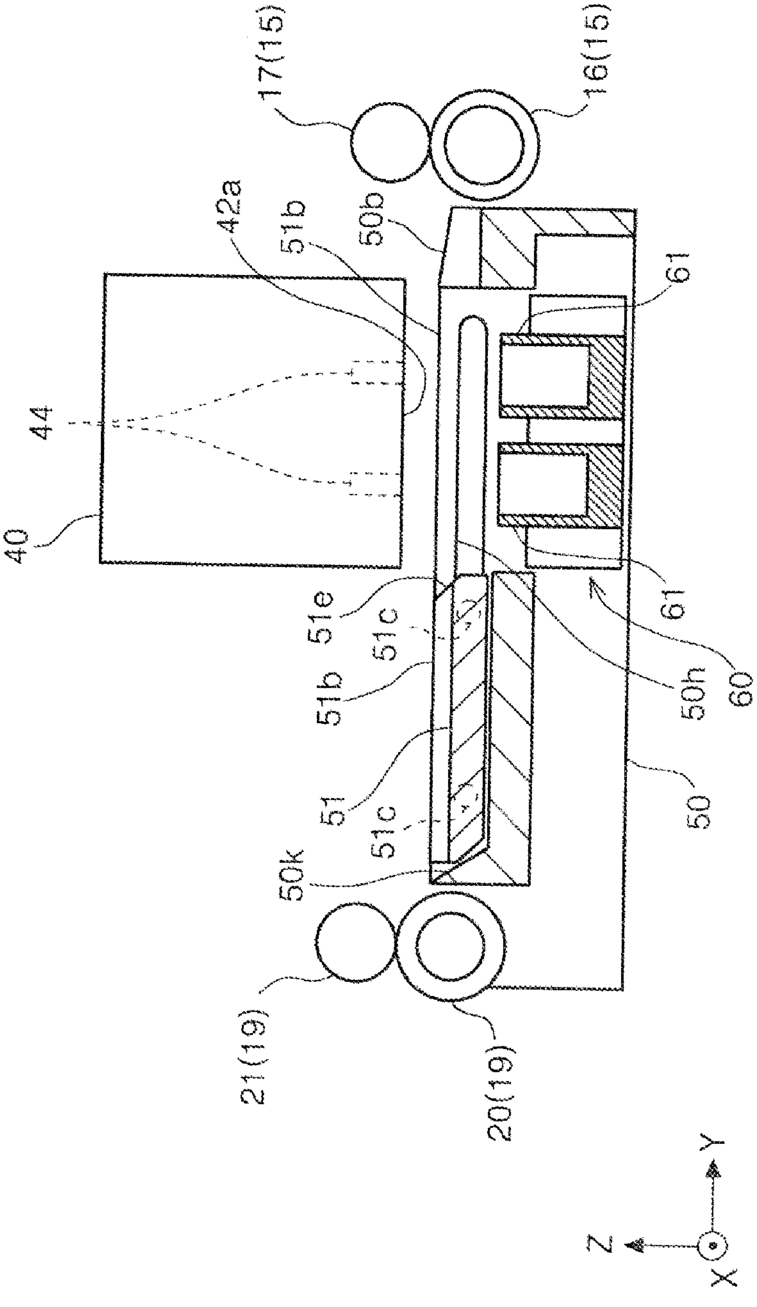
FIG. 12 is a cross-sectional view illustrating the opposing section and cap sections in a state in which the shutter is disposed at the open position and the cap sections are disposed at a descending position.

When receiving recording data to perform recording in this state, the control unit 80 first causes the cap unit 60 to move from the capping position to the descending position as indicated in the transition from FIG. 11 to FIG. 12. Then, the shutter 51 is moved from the open position to the shielding position as indicated in the transition from FIG. 12 to FIG. 13. This enables the shutter 51 to support the medium at a position that is opposed to the line head 40. That is, the platen gap is defined by the shutter 51. When the shutter 51 is disposed at the shielding position, this shutter 51 shields the opening portion 50*a* of the opposing section 50.

Note that the reference character 50*k* represents a guide section configured to guide the leading edge of the medium to the nipping position of the second transport roller pair 19. In FIGS. 2, 3, and 9, the guide section 50*k* is not illustrated.

Figure 13:
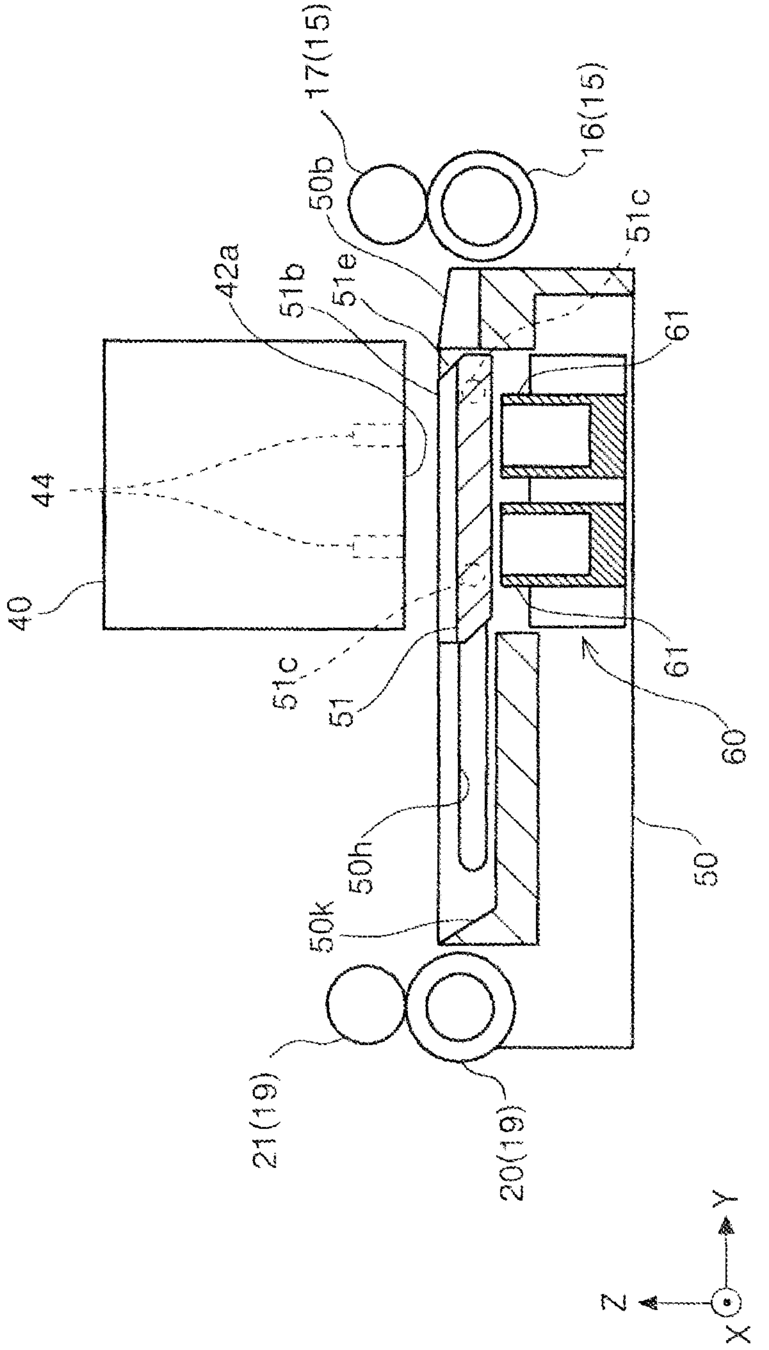
FIG. 13 is a cross-sectional view illustrating the opposing section and cap sections in a state in which the shutter is disposed at a shielding position and the cap sections are disposed at the descending position.

Upon ending of the recording job, the control unit 80 causes the shutter 51 to move from the shielding position to the open position as indicated in the transition from FIG. 13 to FIG. 12. Next, the cap unit 60 is moved from the descending position to the capping position as indicated in the transition from FIG. 12 to FIG. 11.

Note that, although the present embodiment employs a configuration in which the cap unit 60 is moved upward and downward to cause the cap section 61 to cover the head surface 42*a*, it may be possible to employ a configuration in which the cap unit 60 is fixedly provided, and the line head 40 moves downward from the recording position to cause the cap section 61 to cover the head surface 42*a*.

Here, as described with reference to FIGS. 2, 3, and 9, the opposing section 50 includes, in the opening portion 50*a*, the first support portion 50*c* and the second support portion 50*d* (each of which serves as one example of the support portion) provided between two head chips 43 adjacent to each other in the medium width direction.

Figure 14:
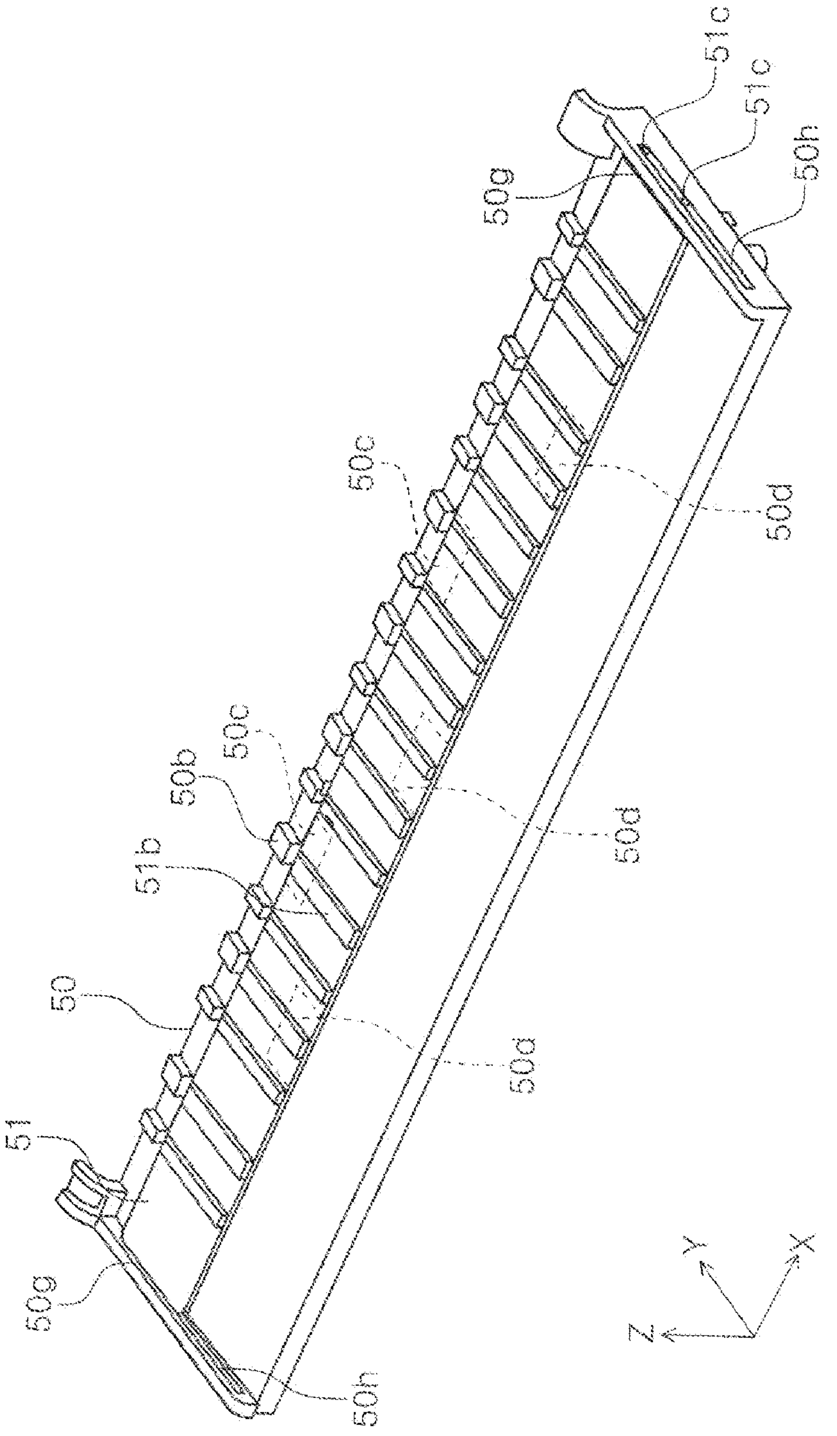
FIG. 14 is a perspective view illustrating the opposing section in a state in which the shutter is disposed at the shielding position.

In addition, as illustrated in FIG. 14, when the shutter 51 is disposed at the shielding position, the first support portion 50*c* and the second support portion 50*d* are disposed at the lower side of the shutter 51. This configuration enables the first support portion 50*c* and the second support portion 50*d* to support the shutter 51 disposed at the shielding position.

Thus, it is possible to suppress bending of the shutter 51 toward the inner side of the opening portion 50*a*. This makes it possible to appropriately maintain the platen gap, and maintain appropriate recording quality.

Note that it may be possible to employ a configuration in which the first support portion 50*c* and the second support portion 50*d* come into contact with the shutter 51 when the shutter 51 is disposed at the shielding position, or a configuration in which the shutter 51 bends to some degree to cause the shutter 51 to come into contact with the first support portion 50*c* and the second support portion 50*d*.

Furthermore, it may be possible to employ a configuration in which only either the first support portion 50*c* or the second support portion 50*d* is provided.

However, with the first support portion 50*c* and the second support portion 50*d* being provided, it is possible to more appropriately support the shutter 51. Thus, it is possible to more appropriately maintain the platen gap. Furthermore, the first support portion 50*c* and the second support portion 50*d* are provided between every two head chips 43 adjacent in the medium width direction. This makes it possible to more appropriately support the shutter 51.

Furthermore, in the present embodiment, the open position of the shutter 51 is disposed downstream of the shielding position in the medium transport direction, and a corner portion, at a downstream end in the medium transport direction, of the first support portion 50*c* is formed as the chamfered section 50*e*. With this configuration, it is possible to prevent the shutter 51 from getting caught on the first support portion 50*c* when the shutter 51 moves in an upstream direction of the medium transport direction, that is, when the shutter 51 moves from the open position toward the shielding position.

In addition, the shutter 51 includes the plurality of first ribs 51*b* extending in the medium transport direction and provided so as to be spaced apart from each other along the width direction intersecting the medium transport direction. This makes it possible to reduce a contact area between the medium and the shutter 51, and also enables the shutter 51 to smoothly guide the medium. In addition, with the first ribs 51*b*, the rigidity of the shutter 51 in the medium transport direction improves, which makes it possible to further suppress bending of the shutter 51.

Furthermore, the opposing section 50 includes a plurality of second ribs 50*b* extending in the medium transport direction and provided upstream of the shutter 51 in the medium transport direction so as to be spaced apart from each other along the medium width direction, and when the shutter 51 is disposed at the shielding position, the first ribs 51*b* and the second ribs 50*b* are continuous with each other along the medium transport direction (see FIGS. 13 and 14).

As the second ribs 50*b* are provided upstream, in the medium transport direction, of the shutter 51 that is disposed at the shielding position in this manner, the medium is more smoothly guided.

In addition, in a case where the second ribs 50*b* are provided at the shutter 51, the displacement necessary for the shutter 51 to open the opening portion 50*a* increases. Thus, it is necessary for the second transport roller pair 19 disposed downstream of the shutter 51 to be disposed more downstream. In a case where the second transport roller pair 19 disposed downstream of the shutter 51 is disposed more downstream, this increases a distance between the first transport roller pair 15 disposed upstream of the shutter 51 and the second transport roller pair 19 disposed downstream of the shutter 51. This makes the posture of a medium more likely to be unstable at a position that is opposed to the line head 40, which may lead to a deterioration of recording quality.

However, as described above, the second ribs 50*b* are provided at the opposing section 50. Thus, it is possible to reduce the displacement necessary for the shutter 51 to open the opening portion 50*a*. This makes it possible to suppress a deterioration in the printing quality described above.

In addition, a corner portion, at an upstream end in the medium transport direction, of the first rib 51*b* is formed as a chamfered section 51*e* (see FIG. 13). With this configuration, it is possible to prevent the medium from getting caught on the first ribs 51*b* when the medium is transported in the downstream direction. Note that the chamfered section 51*e* may be formed into a rounded shape, instead of the chamfered shape.

Next, an opposing section 50A according to another embodiment will be described with reference to FIGS. 15 to 20.

Figure 15:
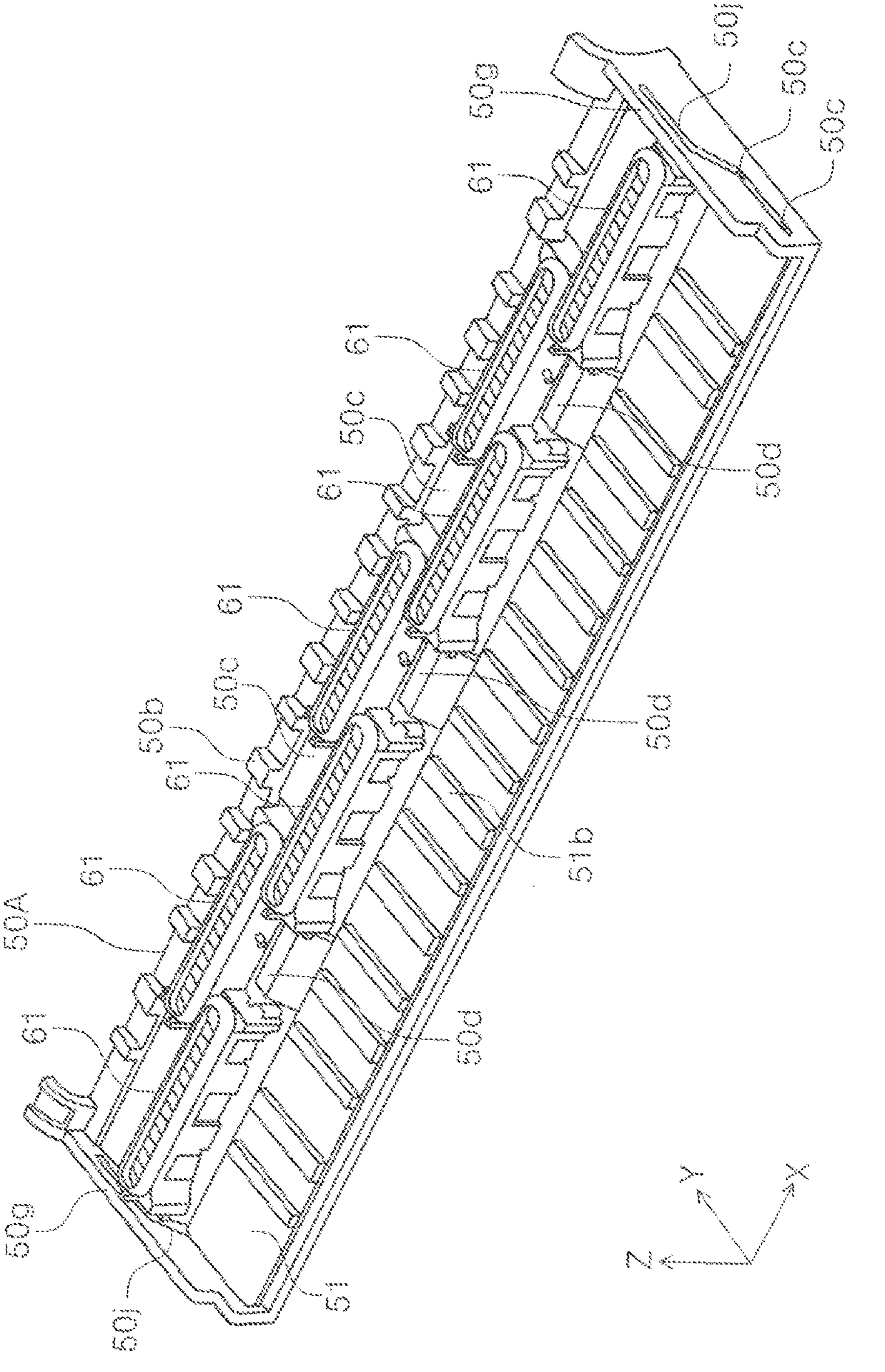
FIG. 15 is a diagram illustrating another embodiment of the opposing section, and is a perspective view illustrating the opposing section and cap sections in a state in which the shutter is disposed at the open position and the cap sections are disposed at the capping position.
Figure 16:
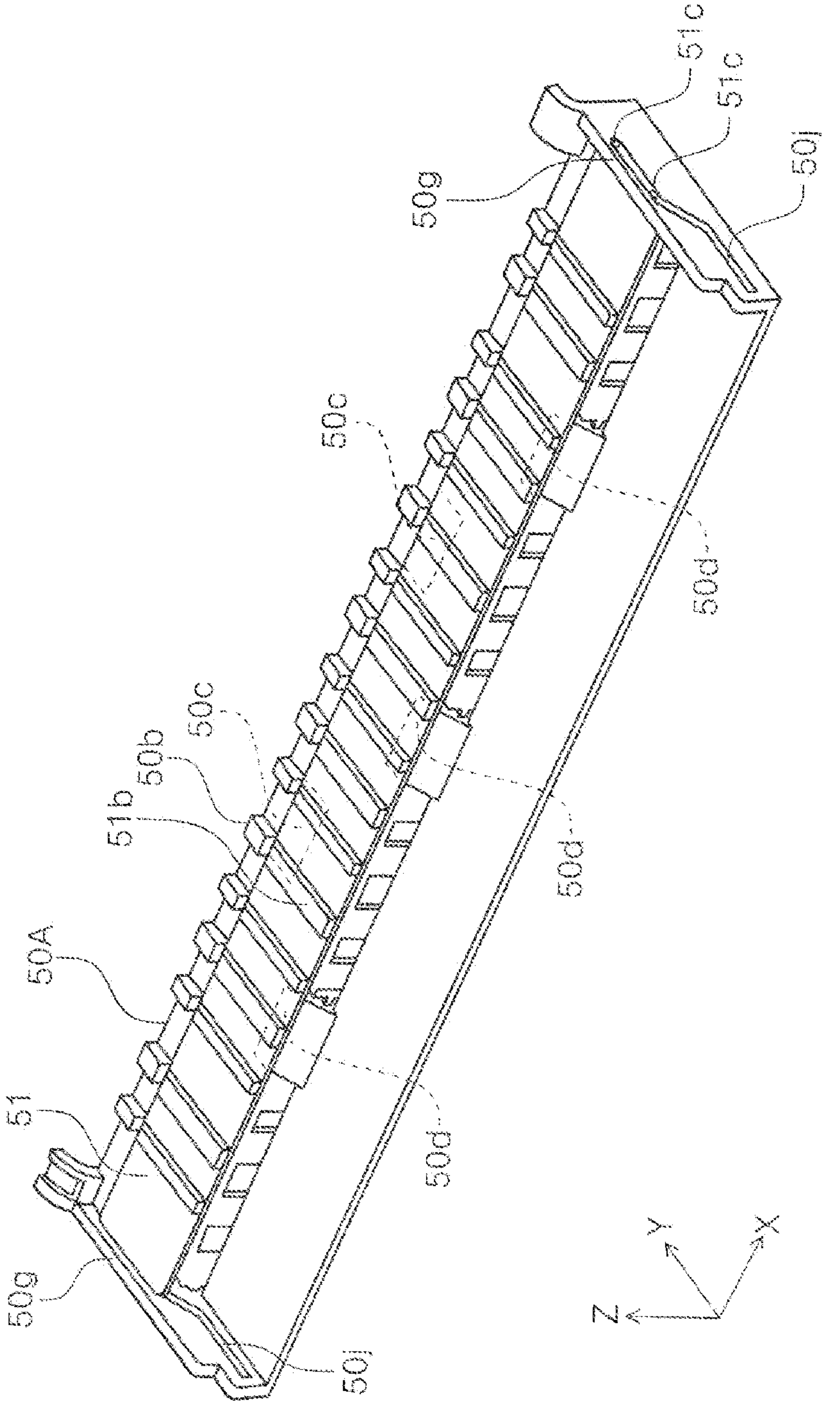
FIG. 16 is a diagram illustrating another embodiment of the opposing section, and is a perspective view illustrating the opposing section in a state in which the shutter is disposed at the shielding position.

As illustrated in FIGS. 15 and 16, a guide hole 50*j* is formed at the guide section 50*g* of the opposing section 50A. Unlike the guide hole 50*h* described above, the guide hole 50*j* according to the present embodiment is formed so as to extend downstream from an upstream end in the medium transport direction and parallel along the medium transport direction, then be sloped downward and downstream, and extend parallel along the medium transport direction again.

Figure 20:
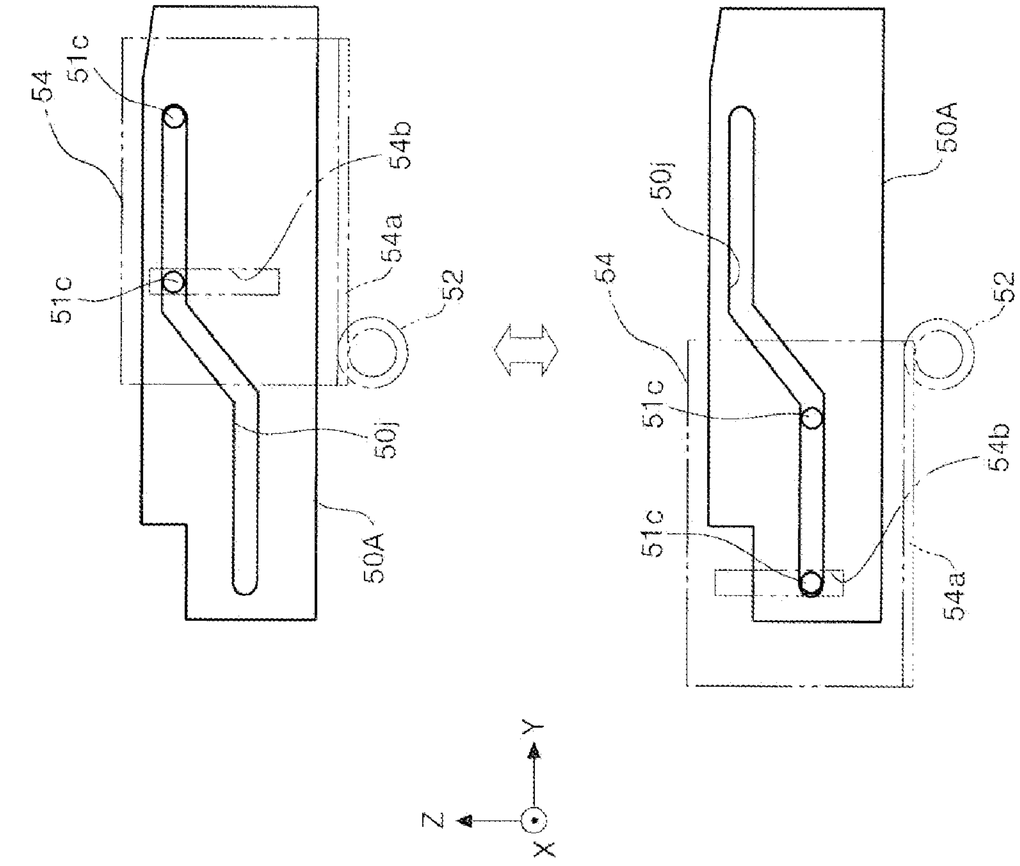
FIG. 20 is a diagram illustrating a driving mechanism configured to drive the shutter of the opposing section according to another embodiment.

A rack member 54 illustrated in FIG. 20 is provided at both sides of the opposing section 50A in the medium width direction so as to be able to be displaced along the medium transport direction. The pinion toothed gear 52 that causes the shutter 51 to be displaced meshes with a rack portion 54*a* formed at the rack member 54. As the pinion toothed gear 52 rotates with power of the shutter driving motor 88 (see FIG. 10), the rack member 54 is displaced along the medium transport direction.

A long hole 54*b* extending in an up-down direction is formed in the rack member 54. One boss 51*c* formed at the shutter 51 is longer, in the medium width direction, than other bosses 51*c*, and is inserted into the long hole 54*b*. Thus, as the rack member 54 is displaced in the medium transport direction, the boss 51*c* inserted into the long hole 54*b*, that is, the shutter 51 is displaced in the medium transport direction. Here, when the boss 51*c* passes through a sloped portion of the guide hole 50*j*, the boss 51*c* is displaced in the up-down direction. However, the long holes 54*b* of the rack member 54 extends in the up-down direction. Thus, the boss 51*c* is able to be displaced within the long hole 54*b* in the up-down direction. With such a configuration, it is possible to displace the boss 51*c*, that is, the shutter 51 along the guide hole 50*j* using the rack member 54 as indicated in the transition from the upper diagram in FIG. 20 to the lower diagram, or as indicated in the transition from the lower diagram in FIG. 20 to the upper diagram.

Figure 17:
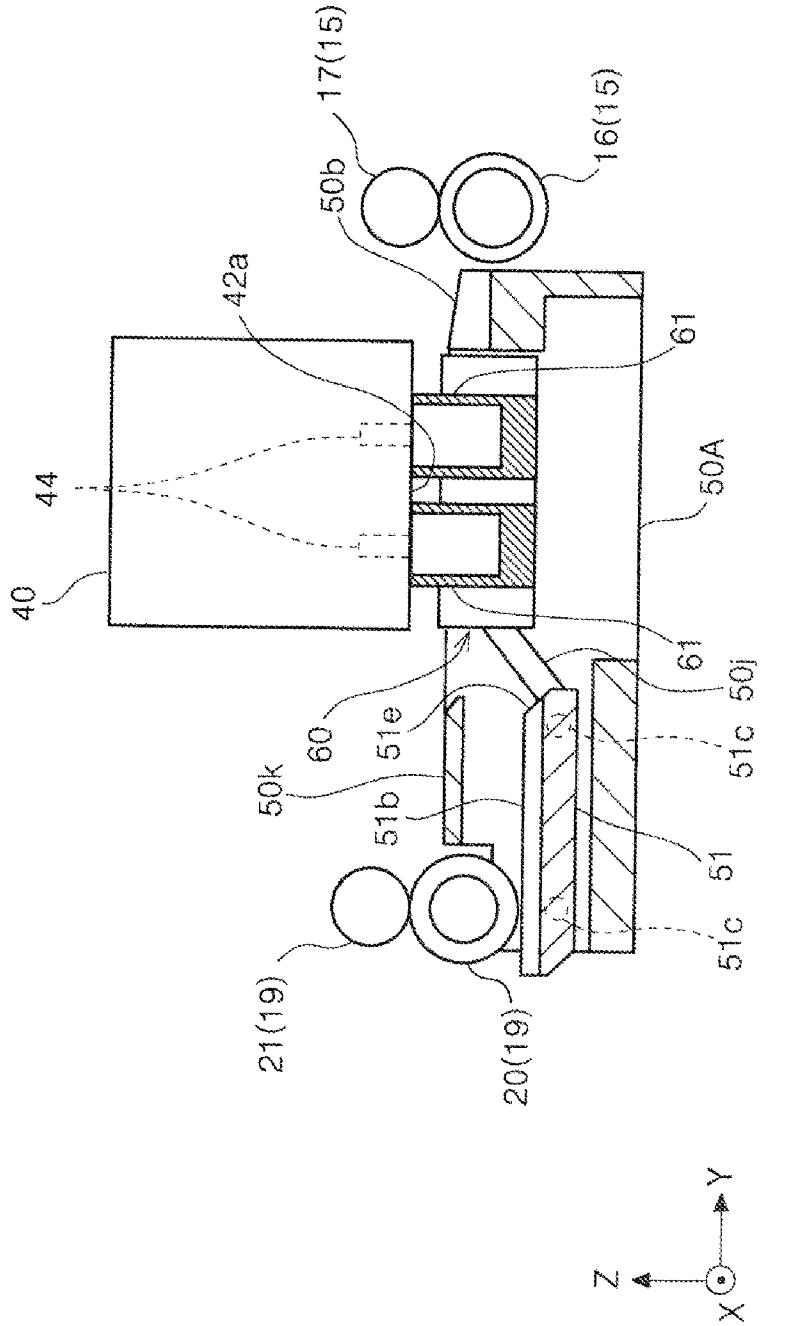
FIG. 17 is a diagram illustrating another embodiment of the opposing section, and is a cross-sectional view illustrating the opposing section and cap sections in a state in which the shutter is disposed at the open position and the cap sections are disposed at the capping position.
Figure 19:
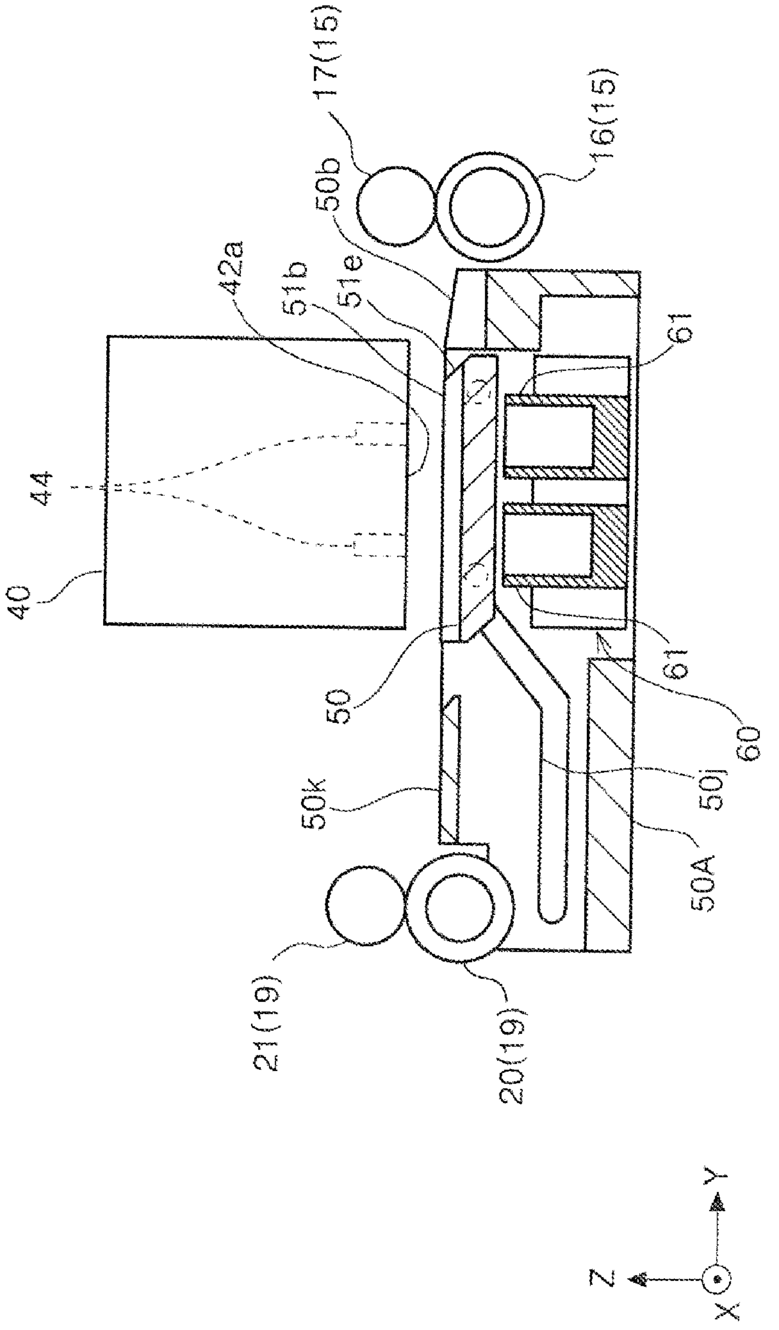
FIG. 19 is a diagram illustrating another embodiment of the opposing section, and is a cross-sectional view illustrating the opposing section and cap sections in a state in which the shutter is disposed at the shielding position and the cap sections are disposed at the descending position.

FIGS. 15 and 17 illustrate a state in which the cap unit 60 is disposed at the capping position and the shutter 51 is disposed at the open position. In addition, FIGS. 16 and 19 illustrate a state in which the cap unit 60 is disposed at the descending position and the shutter 51 is disposed at the shielding position.

The control unit 80 turns the cap unit 60 and the shutter 51 into the state illustrated in FIG. 15 at the recording stand-by state at the time of turning off the device or turning on the device.

Figure 18:
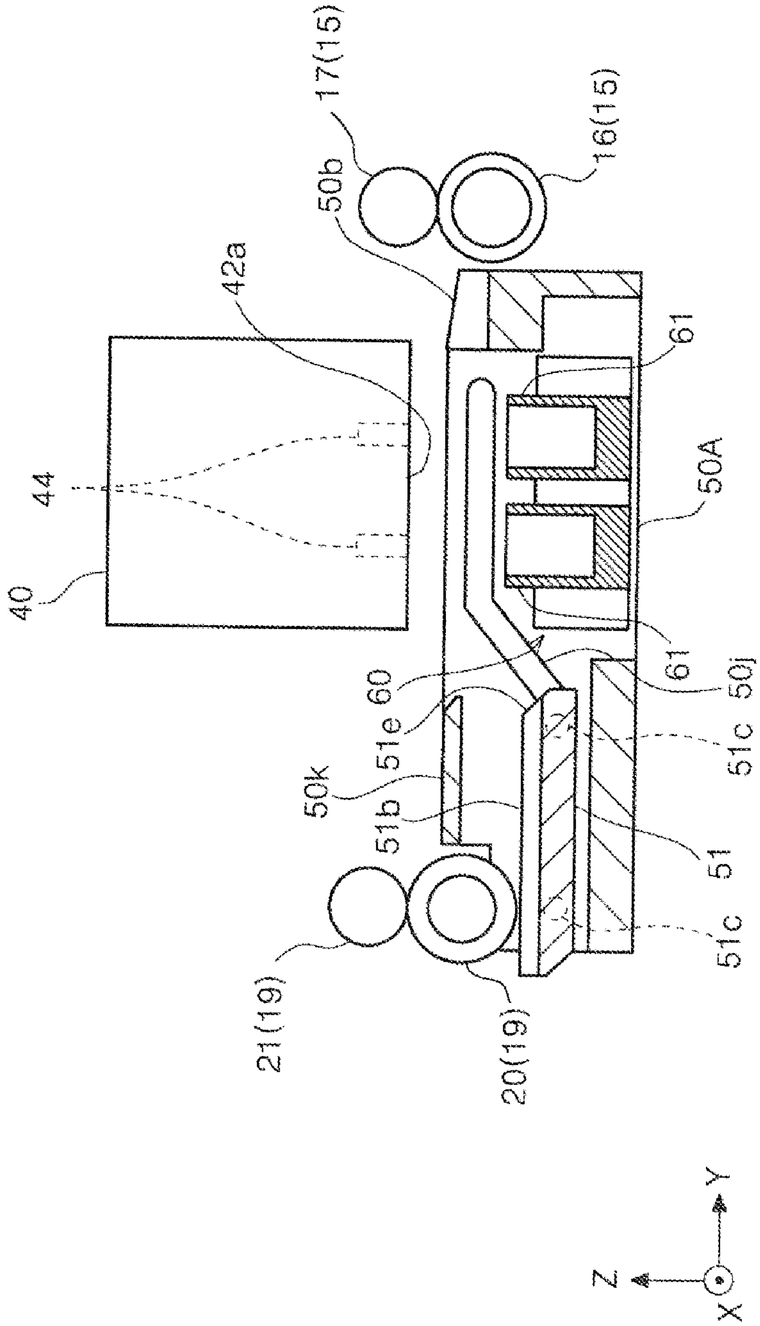
FIG. 18 is a diagram illustrating another embodiment of the opposing section, and is a cross-sectional view illustrating the opposing section and cap sections in a state in which the shutter is disposed at the open position and the cap sections are disposed at the descending position.

When receiving recording data to perform recording in this state, the control unit 80 first causes the cap unit 60 to move from the capping position to the descending position as indicated in the transition from FIG. 17 to FIG. 18. Then, the shutter 51 is moved from the open position to the shielding position as indicated in the transition from FIG. 18 to FIG. 19. This enables the shutter 51 to support the medium at a position that is opposed to the line head 40.

That is, the platen gap is defined by the shutter 51. When the shutter 51 is disposed at the shielding position, this shutter 51 shields the opening portion 50*a* of the opposing section 50A.

Note that the reference character 50*k* represents a guide section configured to guide the leading edge of the medium to the nipping position of the second transport roller pair 19. In FIGS. 15 and 16, the guide section 50*k* is not illustrated.

Upon ending of the recording job, the control unit 80 causes the shutter 51 to move from the shielding position to the open position as illustrated in the transition from FIG. 19 to FIG. 18. Next, the cap unit 60 is moved from the descending position to the capping position as indicated in the transition from FIG. 18 to FIG. 17.

In the present embodiment, the shutter 51 disposed at the open position is disposed under the second transport roller pair 19 as illustrated in FIGS. 17 and 18. Below, operation and effects of this configuration will be described.

In a case where the shutter 51 moves horizontally along the medium transport direction in a configuration in which the open position of the shutter 51 is disposed downstream of the shielding position in the medium transport direction, the driving roller 20 disposed downstream of the shutter 51 needs to be disposed more downstream in order to avoid interference between the shutter 51 and the driving roller 20 disposed downstream of the shutter 51. In a case where the driving roller 20 disposed downstream of the shutter 51 is disposed more downstream, this increases a distance between the first transport roller pair 15 disposed upstream of the shutter 51 and the second transport roller pair 19 disposed downstream of the shutter 51. This makes the posture of a medium more likely to be unstable at a position that is opposed to the line head 40, which may lead to a deterioration of recording quality.

However, with the present configuration, the shutter 51 disposed at the open position is provided under the second transport roller pair 19. Thus, the second transport roller pair 19 disposed downstream of the shutter 51 can be disposed more upstream. This makes it possible to suppress a deterioration in the printing quality described above.

Figure 22:
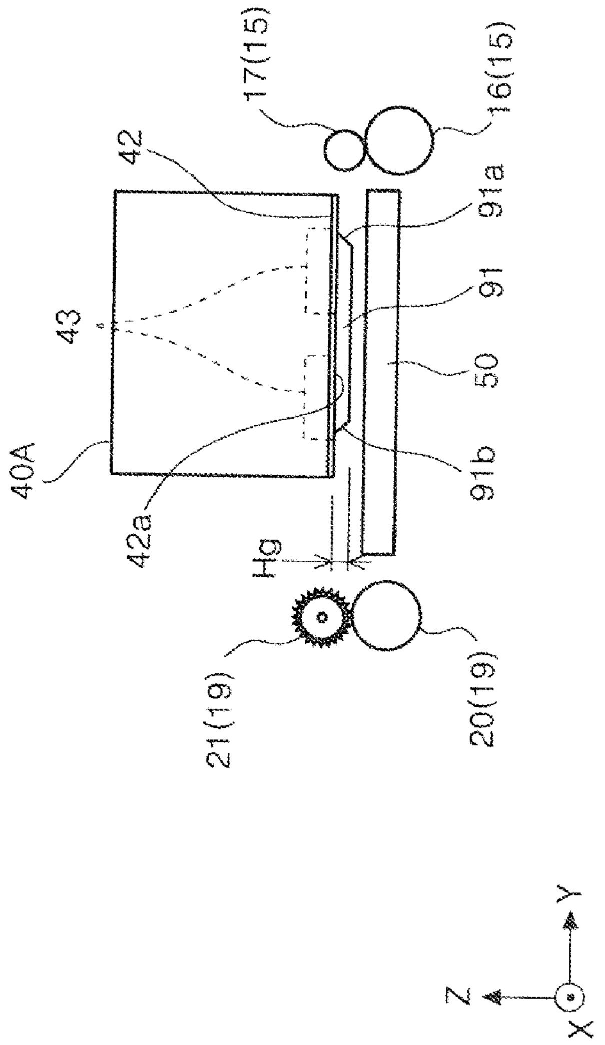
FIG. 22 is a diagram illustrating a portion of a medium transport path and including a line head provided with a protruding member.

Next, as a way to suppress head rubbing of a medium, a protruding member 91, which will be described below, may be provided at the line head 40. Below, description will be made of a configuration in which the protruding member 91 is provided. As illustrated in FIG. 22, the protruding member 91 is provided between the first transport roller pair 15 and the second transport roller pair 19 in the medium transport direction. The protruding member 91 is disposed at a position that overlaps with a line head 40A in the medium transport direction.

In the present embodiment, the protruding member 91 is a rib-shaped member protruding from the plate member 42 toward the opposing section 50. The protruding member 91 can be made of a resin material, and as one example, is made of polyoxymethylene (POM).

The protruding member 91 can be fixed to the plate member 42, the head chip 43, or an exposing portion (not illustrated) where a portion of the base 41 constituting a base body of the line head 40A is exposed, by using a fixing method such as gluing, melting and attaching, and press fitting.

Figure 21:
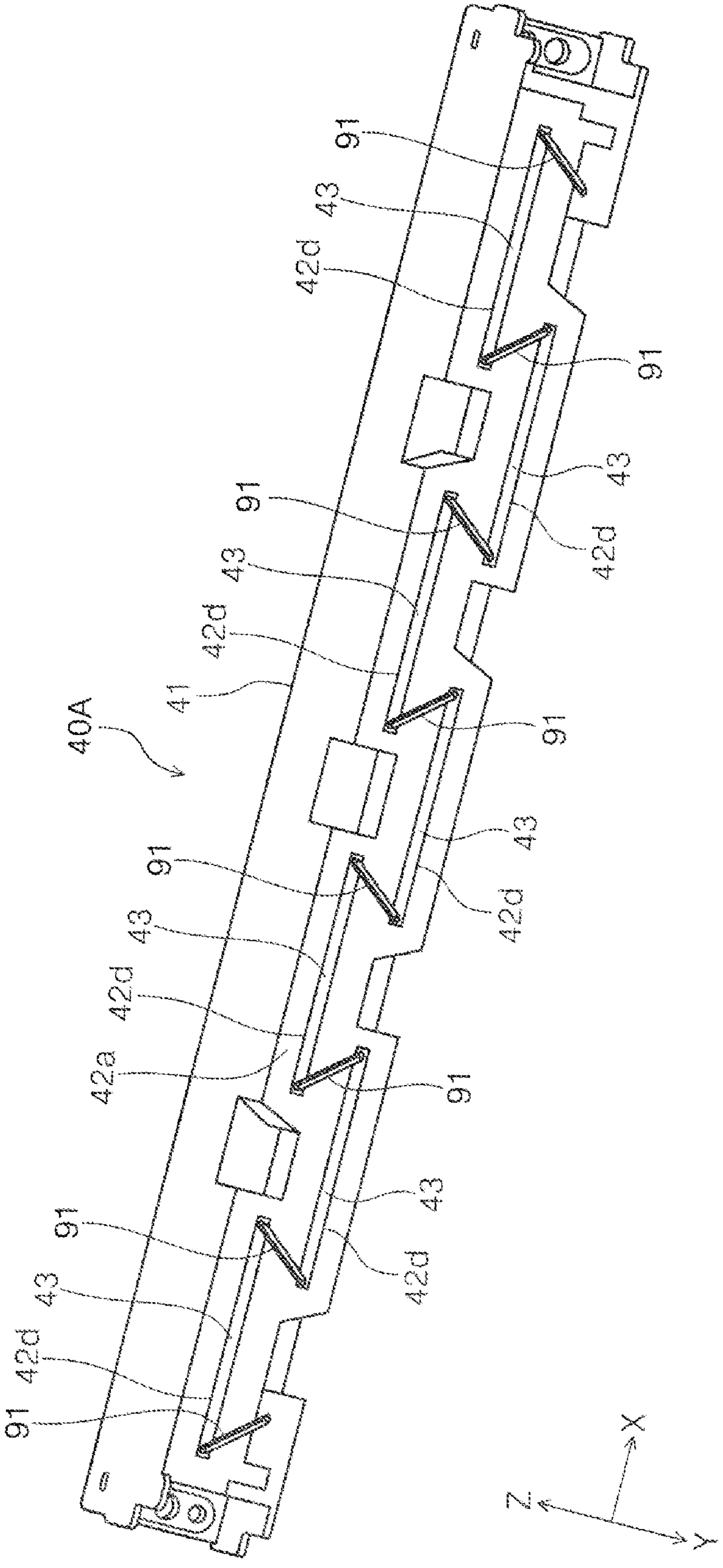
FIG. 21 is a perspective view illustrating a line head provided with protruding members.
Figure 23:
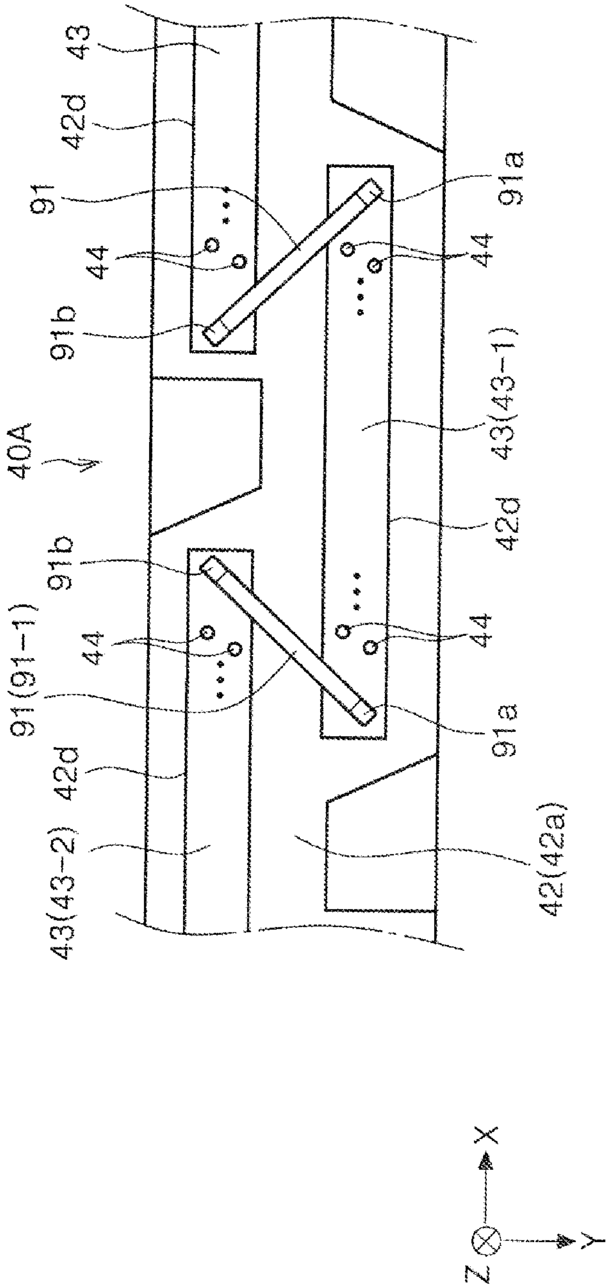
FIG. 23 is a plan view illustrating a portion of a line head provided with a protruding member.

As illustrated in FIGS. 21 and 23, when the head surface 42*a* is viewed in plan view from the −Z direction, the protruding member 91 is within a region of the line head 40A. Note that, in the present embodiment, the cap section 61 described above is formed into a shape in which the cap section 61 does not interfere with the protruding member 91.

The protruding member 91 is disposed so as to avoid the nozzles 44. In addition, in the present embodiment, the protruding member 91 is provided so as to couple end portions of two head chips 43. For example, on the assumption that the −X direction is set as a first direction and the +X direction is set as a second direction, a protruding member 91-1 in FIG. 23 is provided so as to couple an end portion, at the −X direction, of a head chip 43-1 disposed at an upstream position and an end portion, at the +X direction, of a head chip 43-2 disposed downstream, in the medium transport direction, of the end portion at the −X direction. It is needless to say that, contrary to the above description, it may be possible to arrange the protruding member 91 with the +X direction set as the first direction and the −X direction set as the second direction.

Figure 24:
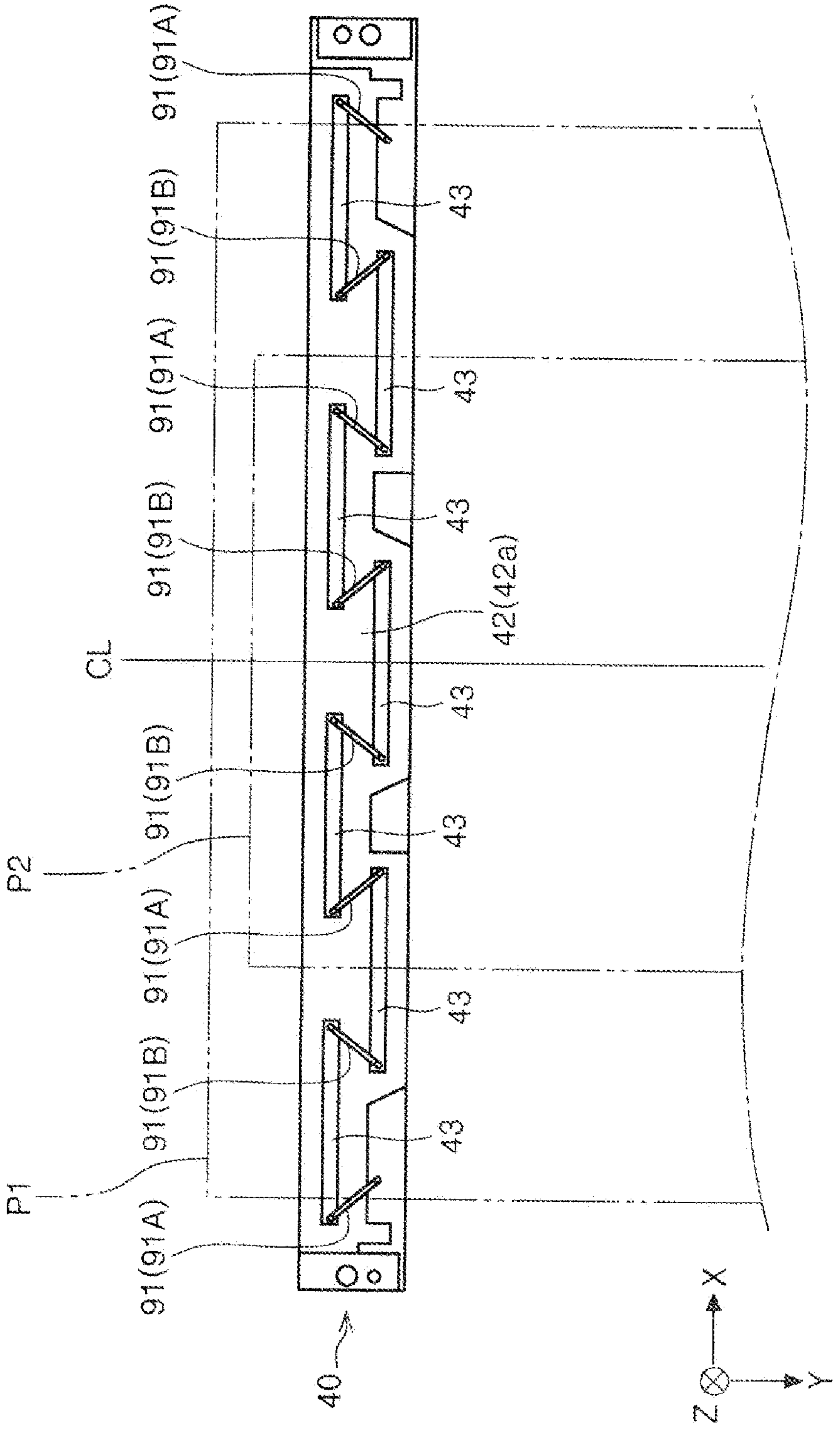
FIG. 24 is a plan view illustrating the entire line head provided with the protruding member.

In the present embodiment, the protruding member 91 is disposed at end portions of all the head chips 43 as illustrated in FIGS. 21 and 24. Note that only one end of the protruding member 91 provided at each of both end portions in the medium width direction is disposed at an end portion of the head chip 43.

In this embodiment, the protruding member 91 covers the entire arrangement region of the nozzles 44 in the medium transport direction.

In FIG. 24, the reference character CL represents a center position of the medium in the medium width direction. The center position of the medium in the medium width direction is the center position CL regardless of the size thereof.

As illustrated in the drawing, the head chips 43 are disposed so as to be symmetrical with the center position CL being the center in the medium width direction. In addition, similarly, the protruding members 91 are also disposed so as to be symmetrical with the center position CL being the center in the medium width direction.

In FIG. 24, the reference character 91A represents a first protruding member extending from the center position CL in the medium width direction to a side end of the medium toward the −Y direction, that is, from upstream toward downstream in the medium transport direction. The reference character 91B represents a second protruding member extending toward the −Y direction, that is, from upstream toward downstream in the medium transport direction and from a side end of the medium in the medium width direction to the center position CL.

The plurality of protruding members 91 are disposed such that a second protruding member 91B and the first protruding member 91A are alternately disposed from the center position CL toward side ends of the medium, and the first protruding member 91A is disposed at the outermost position in the medium width direction.

In FIG. 22, the reference character Hg represents the amount of protrusion of the protruding member 91 that protrudes from the head surface 42*a* toward the −Z direction. This amount of protrusion Hg can be set to more than 0 mm and not more than 5.0 mm, as one example.

A chamfered section 91*a* is formed at a corner portion, at an upstream end in the medium transport direction, of the protruding member 91. In addition, a chamfered section 91*b* is formed at a corner portion, at a downstream end in the medium transport direction, of the protruding member 91.

Note that the chamfered sections 91*a* and 91*b* may be formed into a rounded shape rather than the chamfered shape.

As described above, the plate member 42 includes the head chip 43 including the nozzles 44, and the rib-shaped protruding member 91 disposed so as to avoid the nozzles 44 provided at the head chip 43, the rib-shaped protruding member 91 protruding from the plate member 42 toward the opposing section 50. Thus, with the protruding member 91, the effect of preventing the medium from lifting is more likely to be achieved at a region of the plate member 42, and it is possible to reliably suppress the head rubbing of a medium.

In addition, the protruding member 91 extends in a direction intersecting the medium transport direction. With this configuration, the effect of suppressing the head rubbing using one protruding member 91 can be obtained in a wide area in a direction intersecting the medium transport direction. Thus, it is possible to effectively suppress the head rubbing of a medium, and also reduce the number of protruding members 91. This makes it possible to suppress an increase in cost of the device.

Furthermore, in the present embodiment, the head chip 43 extends in the medium width direction that is a direction perpendicular to the medium transport direction, and a plurality of head chips 43 are arranged alternately at an upstream position and a downstream position along the medium width direction. In addition, the protruding member 91 is provided so as to couple an end portion, in the first direction, of a head chip 43 disposed at the upstream position and an end portion, in the second direction, of a head chip 43 disposed downstream, in the medium transport direction, of the end portion in the first direction.

This enables the protruding member 91 to cover a wide area in the medium transport direction in a region where the protruding member 91 avoids the nozzles 44, which makes it possible to further effectively suppress the head rubbing of the medium.

Furthermore, the corner portion, at an upstream end in the medium transport direction, of the protruding member 91 is formed into a chamfered shape or a rounded shape. This makes it possible to prevent the leading edge of the medium from getting caught on the protruding member 91 when the medium is transported from upstream to downstream in the medium transport direction.

In addition, the corner portion, at a downstream end in the medium transport direction, of the protruding member 91 is formed into a chamfered shape or a rounded shape. This makes it possible to prevent the leading edge of the medium from getting caught on the protruding member 91 when the medium is transported from downstream to upstream in the medium transport direction.

Furthermore, as described with reference to FIG. 24, the plurality of protruding members 91 include the first protruding member 91A extending toward the −Y direction, that is, from upstream toward downstream in the medium transport direction and from the center position CL in the medium width direction to a side end of the medium, and also include the second protruding member 91B extending toward the −Y direction, that is, from upstream toward downstream in the medium transport direction and from a side end of the medium in the medium width direction to the center position CL.

In FIG. 24, the reference character P1 represents a first medium, which is an A4-size sheet having a short-side direction being along the medium width direction as one example. In addition, the reference character P2 represents a second medium, which is an A6-size sheet having a short-side direction being along the medium width direction as one example.

The medium having a predetermined standard size as described above has a side end in the medium width direction that passes through a position that is deviated from the second protruding member 91B.

This configuration makes it possible to obtain the following operation and effects. That is, when the side end of the medium in the medium width direction passes through a position of the second protruding member 91B, the corner portion of the leading edge of the medium is more likely to get caught on the second protruding member 91B, which is more likely to cause jamming. In contrast, when the corner portion of the leading edge of the medium gets caught on the first protruding member 91A, this corner portion is guided to the outside direction, which is less likely to cause jamming.

Furthermore, a side end, in the medium width direction, of the medium having a predetermined standard size passes through a position that is deviated from the second protruding member 91B as described above, which makes it possible to suppress occurrence of jamming described above.

The protruding member 91 described above may obstruct wiping of the head surface 42*a* by the wiper 36 depending on the amount of protrusion from the head surface 42*a* or the hardness of the wiper 36.

Thus, it may be possible to employ a configuration in which the protruding member 91 is provided independent of the line head 40 and the protruding member 91 is spaced apart from the head surface 42*a* when the line head 40 moves to the wiping position.

Figure 25:
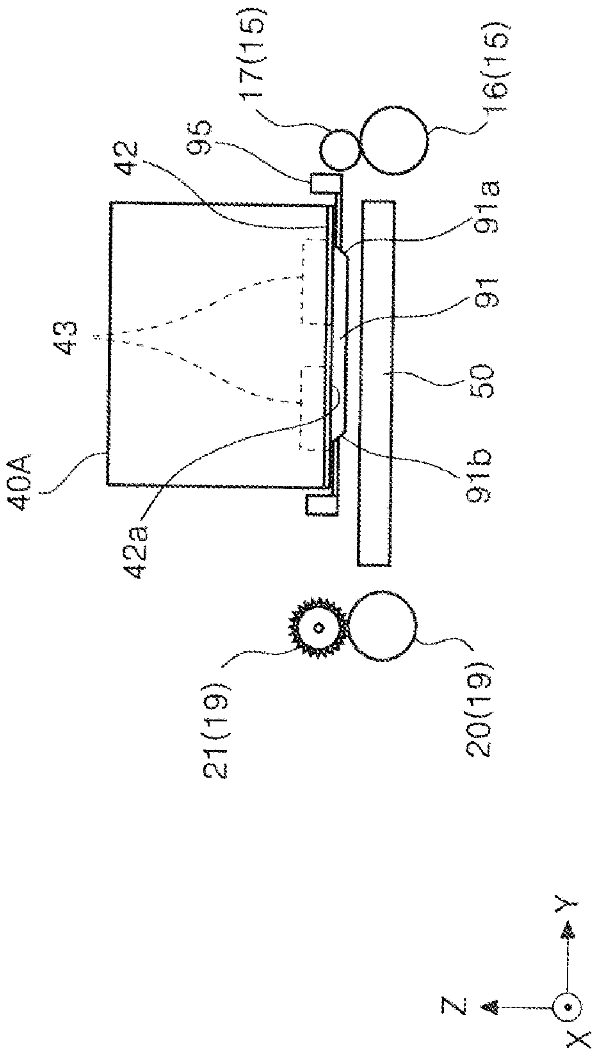
FIG. 25 is a diagram illustrating a portion of the medium transport path in a configuration in which the protruding member is independent of the line head.
Figure 26:
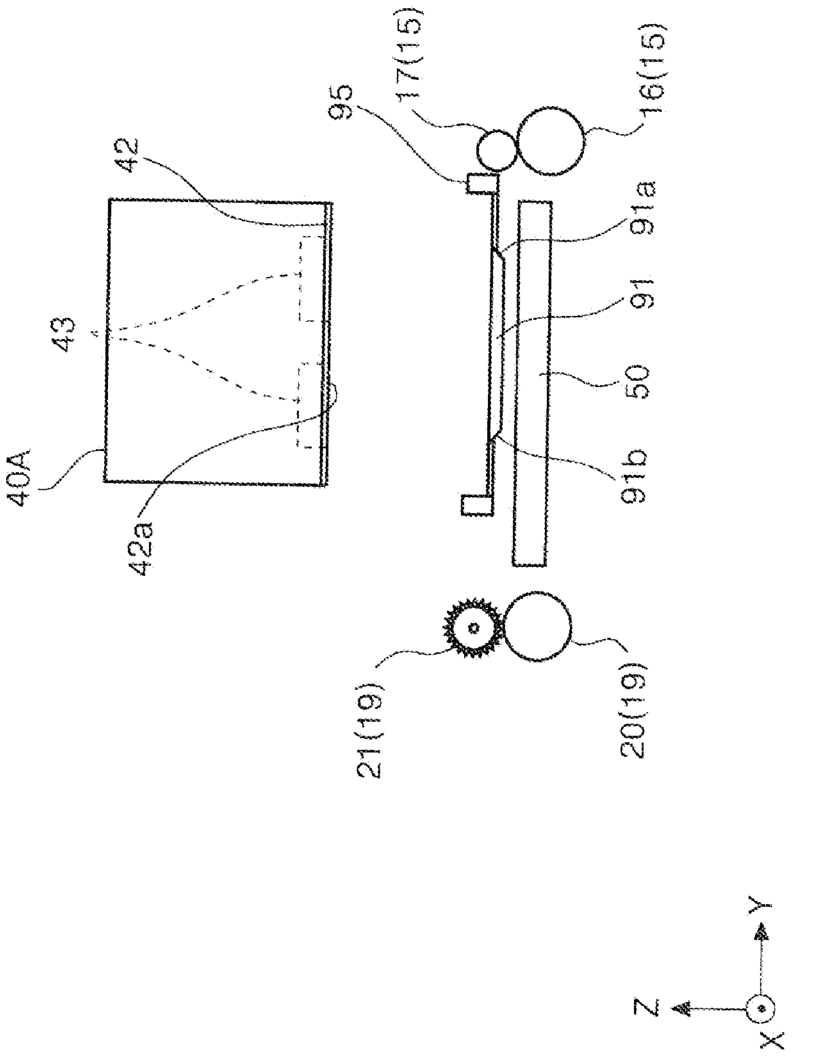
FIG. 26 is a diagram illustrating a portion of the medium transport path in a configuration in which the protruding member is independent of the line head.

FIGS. 25 and 26 illustrate such a configuration. FIG. 25 illustrates a state in which the line head 40 is disposed at the recording position. FIG. 26 illustrates a state in which the line head 40 is disposed at the wiping position.

Figure 27:
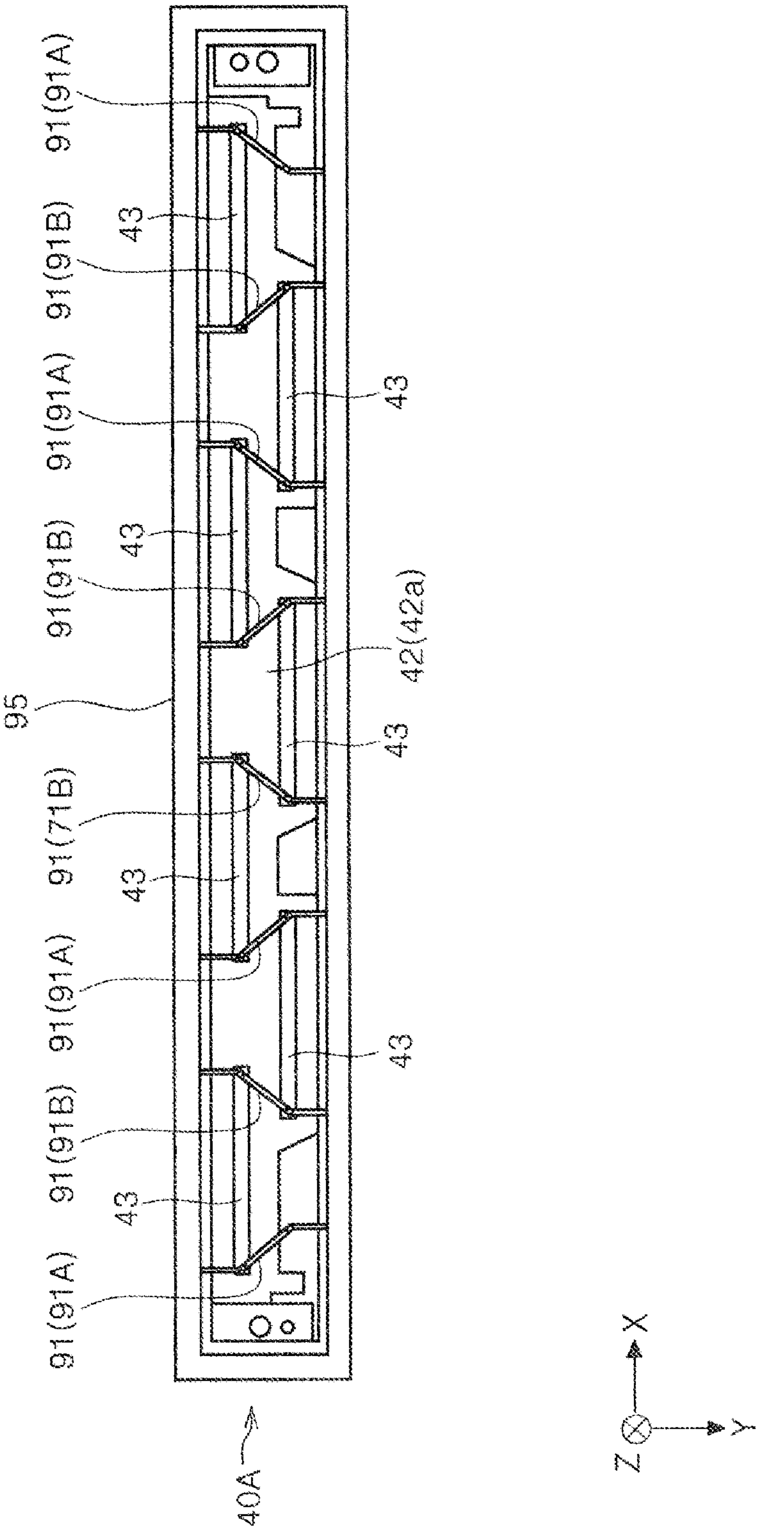
FIG. 27 is a plan view illustrating the line head and the protruding member in a configuration in which the protruding member is independent of the line head.

In the present embodiment, the protruding member 91 is provided at a supporting member 95. The supporting member 95 is shaped so as to surround the periphery of the plate member 42 in a state in which the line head 40 is disposed at the recording position as illustrated in FIG. 27, and is provided at the main frame 7 independently of the line head 40. Furthermore, the protruding member 91 is also provided so as to be independent of the line head 40, as with the supporting member 95.

Since the supporting member 95 and the protruding member 91 are provided so as to be independent of the line head 40, the head surface 42*a* is spaced apart from the protruding member 91 when the line head 40 moves from the recording position to the wiping position as indicated in the transition from FIG. 25 to FIG. 26. With this configuration, a space into which the wiper carriage 35 enters is created between the head surface 42*a* and the supporting member 95 as well as the protruding member 91, which makes it possible to perform wiping of the head surface 42*a* using the wiper 36 without receiving influence of the protruding member 91.

Note that, in the present embodiment, the protruding member 91 causes obstruction when the line head 40 moves from the recording position to the capping position. Thus, as with the opposing section 50 described above, it may be possible to employ a configuration in which the supporting member 95 is provided so as to be able to be displaced in a direction in which the supporting member 95 advances or retreats relative to the line head 40, and a pressing member (not illustrated) is used to apply pressing toward the line head 40. In this case, the ascending limit position of the supporting member 95 is restricted by a restriction unit (not illustrated) that comes into contact with the supporting member 95.

This configuration enables the line head 40 to push the protruding member 91, that is, the supporting member 95 downward when the line head 40 moves from the recording position to the capping position. Thus, the line head 40 is able to move from the recording position to the capping position.

In addition, an edge detector 38 may be provided at the wiper carriage 35 described above. Below, description will be made of a configuration in a case where the edge detector 38 is provided.

Figure 28:
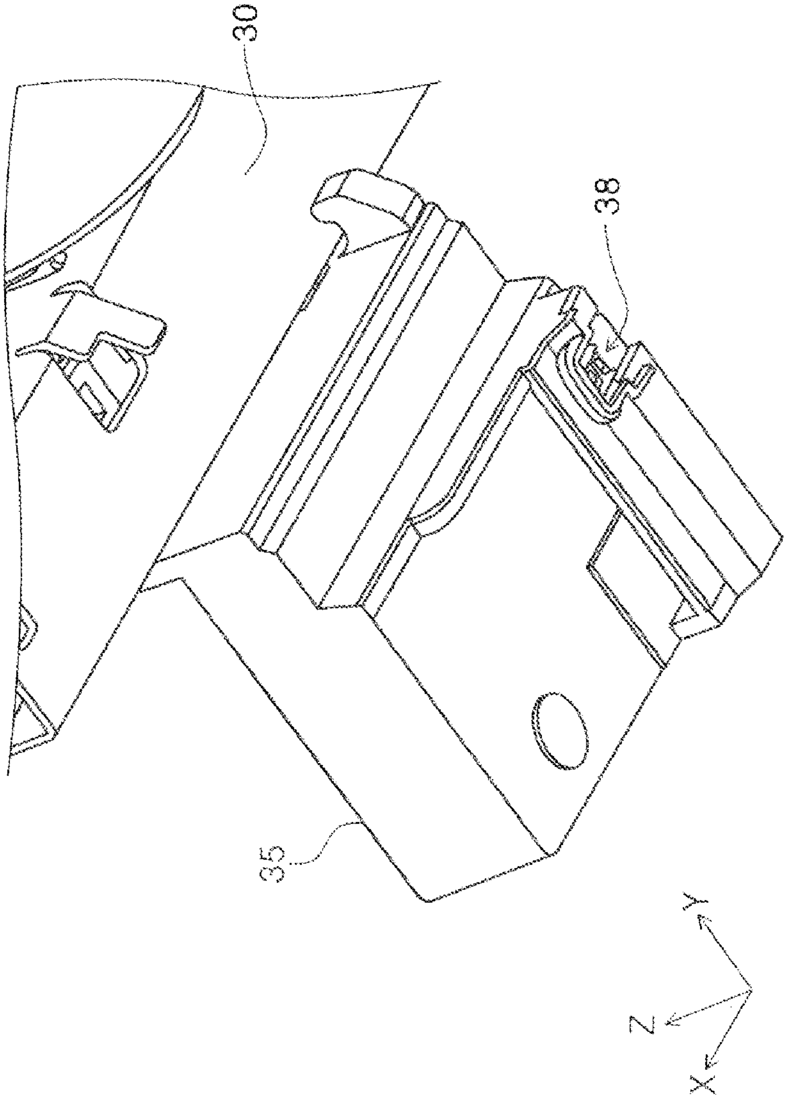
FIG. 28 is a perspective view illustrating a wiper carriage as viewed from the bottom side.

The edge detector 38 used to detect an edge of the medium is provided at the bottom of the wiper carriage 35, as illustrated in FIG. 28.

The edge detector 38 and the control unit 80 (see FIG. 5) are coupled to each other through a flexible flat cable that is not illustrated in the drawing. The flexible flat cable deforms so as to follow the movement of the wiper carriage 35.

The edge detector 38 is an optical sensor, and includes a light-emitting unit (not illustrated) configured to emit detection light toward the opposing section 50 and a light-receiving unit (not illustrated) configured to receive a reflection component of the detection light. The intensity of the reflection component when the detection light is emitted onto the medium is stronger than that when the detection light is emitted onto the opposing section 50. This enables the control unit 80 to detect an edge of the medium based on information about detection by the edge detector 38.

As described with reference to FIG. 12 or 20, the wiper carriage 35 is able to move in the medium width direction and the edge detector 38 is provided at the wiper carriage 35. Thus, it is possible to detect the edge using the edge detector 38 by moving the wiper carriage 35 in the medium width direction in a state in which the medium is positioned at a position where the medium can be detected by the edge detector 38. Note that "detecting an edge" herein means detecting either one of or both of an edge of the medium at the +X direction and an edge of the medium at the −X direction.

Figure 35:
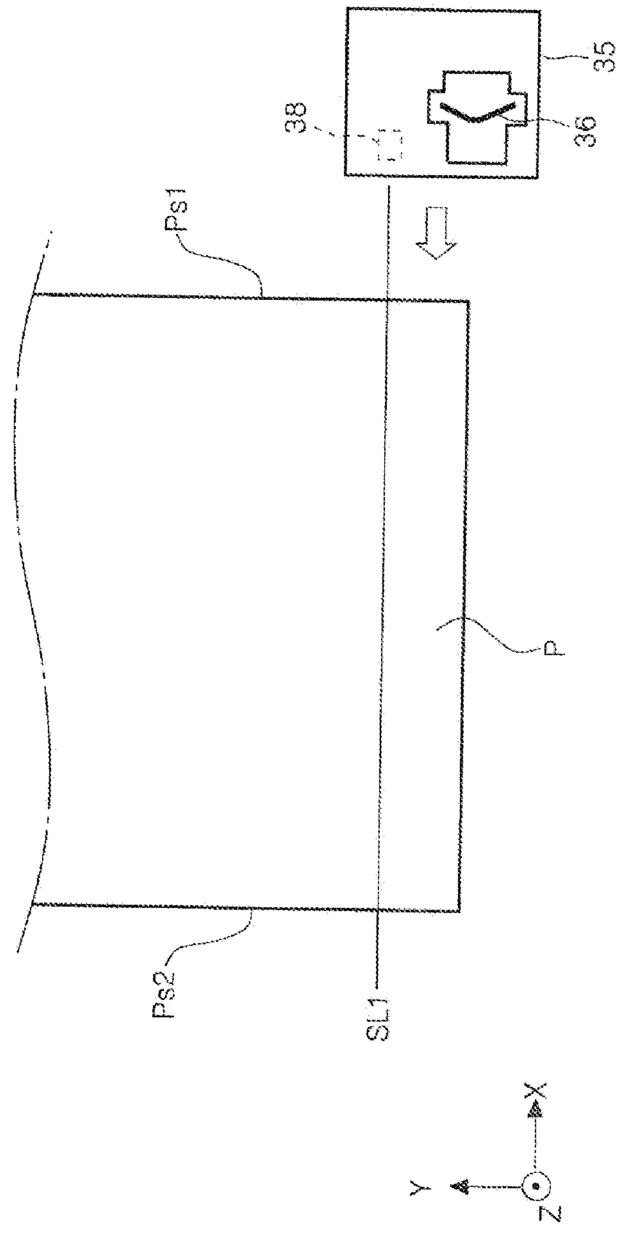
FIG. 35 is a diagram illustrating a positional relationship between an edge detector and a medium at the time of detecting an edge.

In FIG. 35, the reference character Ps1 represents an edge of the medium P at the +X direction, and the reference character Ps2 represents an edge of the medium P in the −X direction. In addition, the line SL1 represents a detection line by the edge detector 38. As illustrated in the drawing, it is possible to detect the position of the edge Ps1 and the position of the edge Ps2 by moving the wiper carriage 35, for example, in an arrowed direction (−X direction) in a state in which the medium is positioned at a position where the medium P can be detected by the edge detector 38. Note that, as described above, an encoder sensor (not illustrated) is provided at the wiper driving motor 31, and this enables the control unit 80 to detect the current position of the wiper carriage 35. Thus, it is possible to detect the position of the edge Ps1 and the position of the edge Ps2 in the medium width direction.

However, it is also possible to detect the edge of the medium in the −Y direction, that is, the leading edge of the medium, or the edge of the medium in the +Y direction, that is, the trailing edge by transporting the medium in a state in which the medium is positioned at a position where the edge detector 38 can detect the medium in the medium width direction, as one example, at the center position in the medium width direction.

When the edge of the medium is detected using the edge detector 38, it may be possible to employ a configuration in which the medium is transported to a position at which the medium is able to be opposed to the edge detector 38 and then the line head 40 moves from the recording position to the +Z direction, or a configuration in which the line head 40 moves from the recording position to the +Z direction before the medium is transported to a position at which the medium is able to be opposed to the edge detector 38. However, it is possible to improve printing throughput by moving the line head 40 from the recording position to the wiping position or a departing position (which will be described later) before the medium is transported to a position at which the medium is able to be opposed to the edge detector 38. For example, it is possible to improve the printing throughput by concurrently performing the operation of moving the line head 40 and a transport operation used to transport the medium to a position at which the medium is able to be opposed to the edge detector 38.

Figure 29:
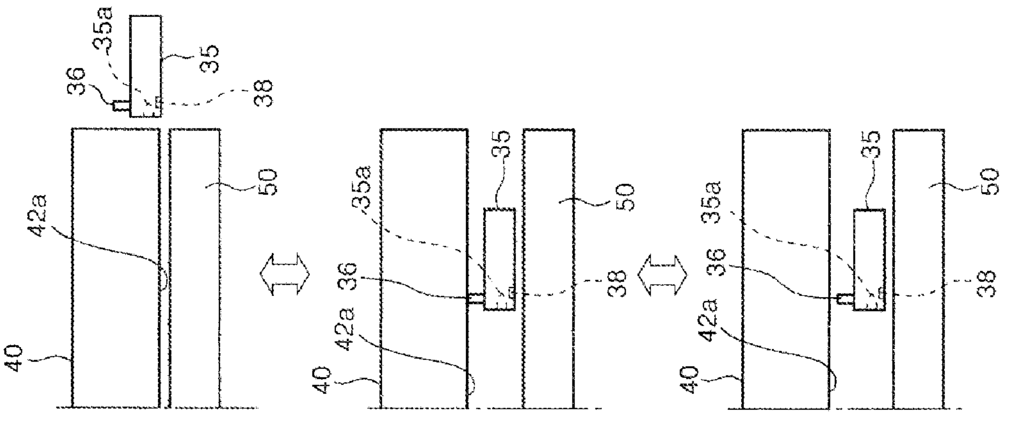
FIG. 29 is a diagram illustrating positions of the line head in a movement region.

Note that the movement region of the line head 40 includes a recording position (uppermost diagram in FIG. 29) at which recording is performed on the medium. In addition, the movement region of the line head 40 includes a wiping position (middle diagram in FIG. 29) at which the head surface 42*a* is wiped by the wiper 36. The wiping position is a position spaced further apart from the opposing section 50 than the recording position. Furthermore, the movement region of the line head 40 includes a departing position (lowermost diagram in FIG. 29) at which the wiper 36 is able to move in the medium width direction in a state in which the wiper 36 is spaced apart from the head surface 42*a*. The departing position is a position spaced further apart from the opposing section 50 than the wiping position.

As described above, the wiper 36 is provided at the wiper carriage 35 configured to move in the medium width direction with power of the wiper driving motor 31, and the edge detector 38 used to detect the edge of the medium is provided at a position of the wiper carriage 35 that is opposed to the opposing section 50. This eliminates the need of a dedicated configuration for moving the edge detector 38 in the medium width direction, which makes it possible to suppress an increase in the size of the device and also suppress an increase in the cost.

Note that the control unit 80 configured to control the wiper driving motor 31 and the head moving motor 81 is able to cause the wiper driving motor 31 to drive to detect the edge using the edge detector 38 in a state in which the line head 40 is positioned at the wiping position. Hereinafter, this is referred to as a first edge detection mode.

With the first edge detection mode, wiping of the head surface 42*a* using the wiper 36 and detection of an edge using the edge detector 38 are performed at the same time. This makes it possible to improve the recording throughput.

Furthermore, the control unit 80 is able to cause the wiper driving motor 31 to drive and detect the edge using the edge detector 38 in a state in which the line head 40 is disposed at the departing position. Hereinafter, this is referred to as a second edge detection mode.

With the second edge detection mode, the load occurred due to the wiper 36 and the head surface 42*a* coming into contact with each other at the time of detecting the edge does not apply to the wiper driving motor 31, which makes it possible to highly precisely detect the edge.

In addition, the control unit 80 is able to only perform wiping of the head surface 42*a* using the wiper 36 without involving edge detection. Hereinafter, this is referred to as a wiping single mode.

Wiping of the head surface 42*a* by the wiper 36 can be performed at the time of turning on the device or turning off the device, as one example. In this case, the control unit 80 selects the wiping single mode, as one example.

In addition, wiping of the head surface 42*a* by the wiper 36 can be performed at timing at which a predetermined period of time elapses from previous wiping of the head surface 42*a*, or at timing at which the total number of sheets of printing reaches a predetermined number of sheets from previous wiping of the head surface 42*a*. In this case, the control unit 80 selects the wiping single mode, as one example.

In addition, the control unit 80 may perform the edge detection to the first medium when a recording job is performed for the first time after the device is turned on. For example, when the designated recording quality is set to “normal”, the control unit 80 may perform the edge detection to the first medium every time a recording job is performed. In this case, the control unit 80 may perform any of the first edge detection mode and the second edge detection mode.

Furthermore, the control unit 80 may perform the edge detection to the first medium of a recording job every time the recording job is performed. For example, when the designated recording quality is set to “high definition”, the control unit 80 may perform the edge detection to the first medium every time a recording job is performed. In this case, the control unit 80 may perform any of the first edge detection mode and the second edge detection mode.

In addition, the control unit 80 may perform the edge detection to the first medium when a recording job is performed for the first time after the medium accommodation cassette 2 is inserted or removed. In this case, the control unit 80 may perform any of the first edge detection mode and the second edge detection mode.

When there is a difference between size information about a medium contained in print data and size information about a medium acquired through edge detection, the control unit 80 stops the recording operation, and also displays an alert on a display unit (not illustrated) of the printer 1 or a display unit (not illustrated) of a computer coupled to the printer 1.

Note that the control unit 80 may perform a flushing operation in which ink is discharged from the nozzles 44 toward the wiper carriage 35 in a state in which the line head 40 is disposed at the departing position. Specifically, the wiper carriage 35 is formed so as to have a size that makes it possible to be opposed to one head chip 43, and the control unit 80 causes ink to be discharged only from a head chip 43 close to the home position in a state in which the wiper carriage 35 is positioned at a position that is opposed to the head chip 43 close to the home position. Such a partial flushing operation is performed sequentially to all the head chips 43 while the wiper carriage 35 is being moved in the −X direction.

By utilizing the wiper carriage 35 in the flushing operation in this manner, it is possible to perform the flushing operation without moving the line head 40 to a position close to the cap section 61.

Next, description will be made of a rotation stopping structure of the wiper carriage 35.

Figure 30:
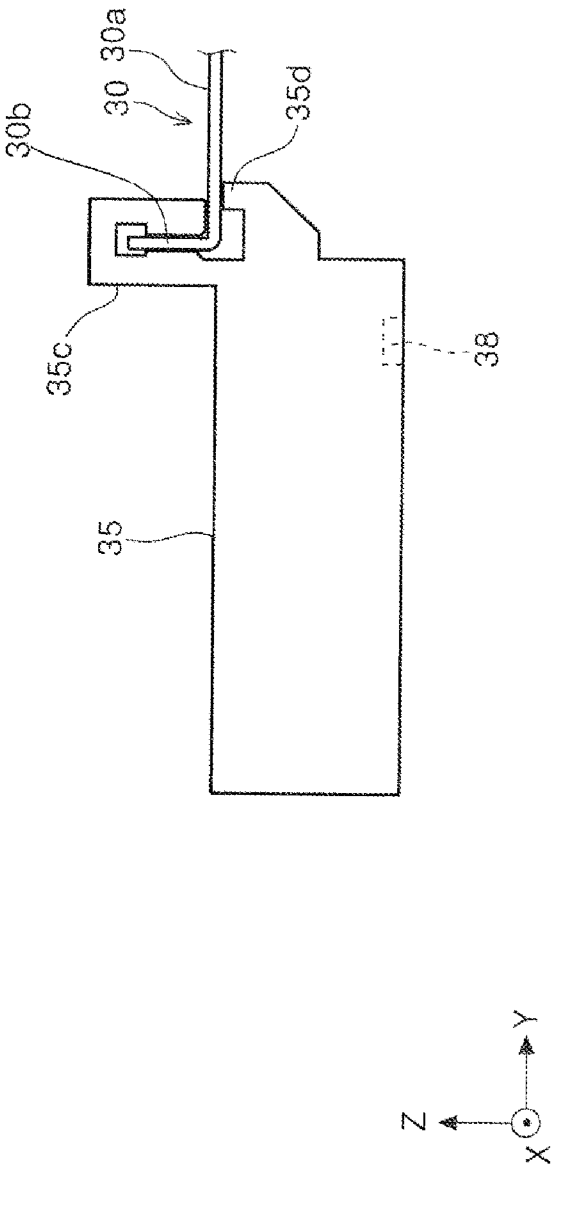
FIG. 30 is a diagram illustrating another embodiment of a rotation stopping structure for a wiper carriage.

FIG. 30 illustrates a rotation stopping structure of the wiper carriage 35 according to the present embodiment.

The wiper frame 30 includes a first frame section 30*a* that constitutes a horizontal surface, and a second frame section 30*b* that constitutes a vertical surface. The first frame section 30*a* and the second frame section 30*b* are both provided so as to extend over the entire movement region of the wiper carriage 35.

The wiper carriage 35 includes a guiding target section 35*c* having a shape that sandwiches the second frame section 30*b*. With the second frame section 30*b* being interposed with the guiding target section 35*c*, the position of the wiper carriage 35 in the Y-axis direction is defined. In addition, the guiding target section 35*c* is in contact with the upper surface of the first frame section 30*a*. With this configuration, the wiper carriage 35 is supported by the first frame section 30*a*.

In the wiper carriage 35, a moment that causes counter-clockwise rotation in FIG. 30 with the guiding target section 35*c* being the center is generated due to the weight of the wiper carriage 35. A rotation stopping section 35*d* is formed in the wiper carriage 35. As the rotation stopping section 35*d* is in contact with the lower surface of the first frame section 30*a*, the rotation is stopped, and the posture of the wiper carriage 35 is defined.

Figure 31:
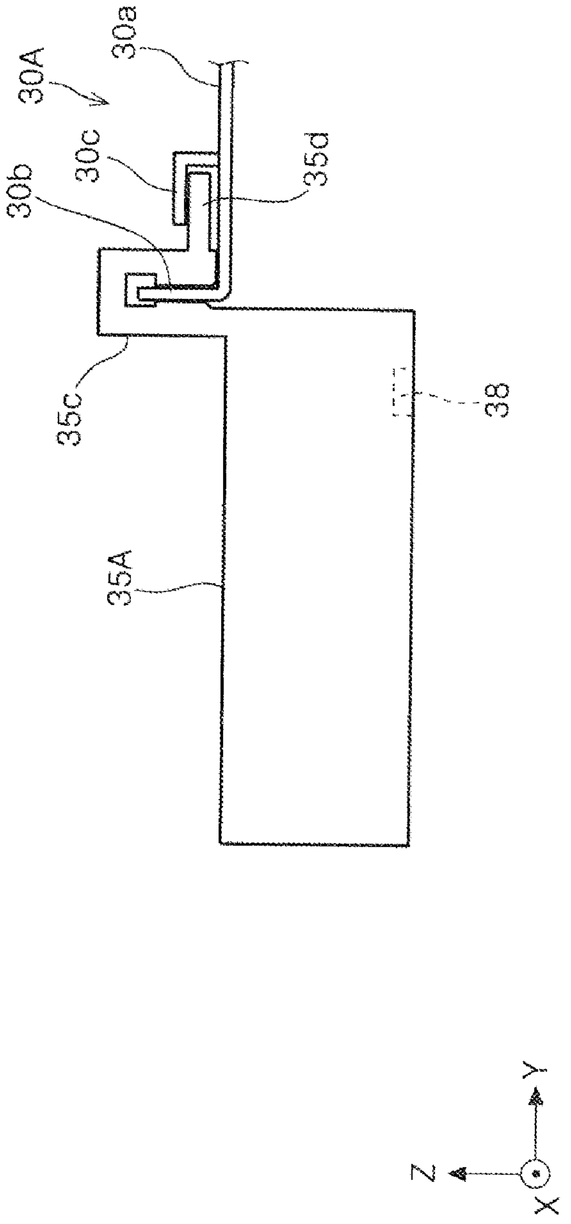
FIG. 31 is a diagram illustrating another embodiment of the rotation stopping structure for the wiper carriage.

The rotation stopping structure of the wiper carriage 35 as described can be modified in a manner as illustrated in FIG. 31. For example, in a wiper carriage 35A illustrated in FIG. 31, a rotation stopping section 35*d* is formed so as to extend in the +Y direction from a guiding target section 35*c*.

A rotation restriction unit 30*c* is formed at the first frame section 30*a* of a wiper frame 30A. The rotation restriction unit 30*c* extends over the entire movement region of the wiper carriage 35.

The rotation stopping section 35*d* extends under the rotation restriction unit 30*c*. With this configuration, rotation of the wiper carriage 35A is stopped, and the posture of the wiper carriage 35A is defined.

Figure 32:
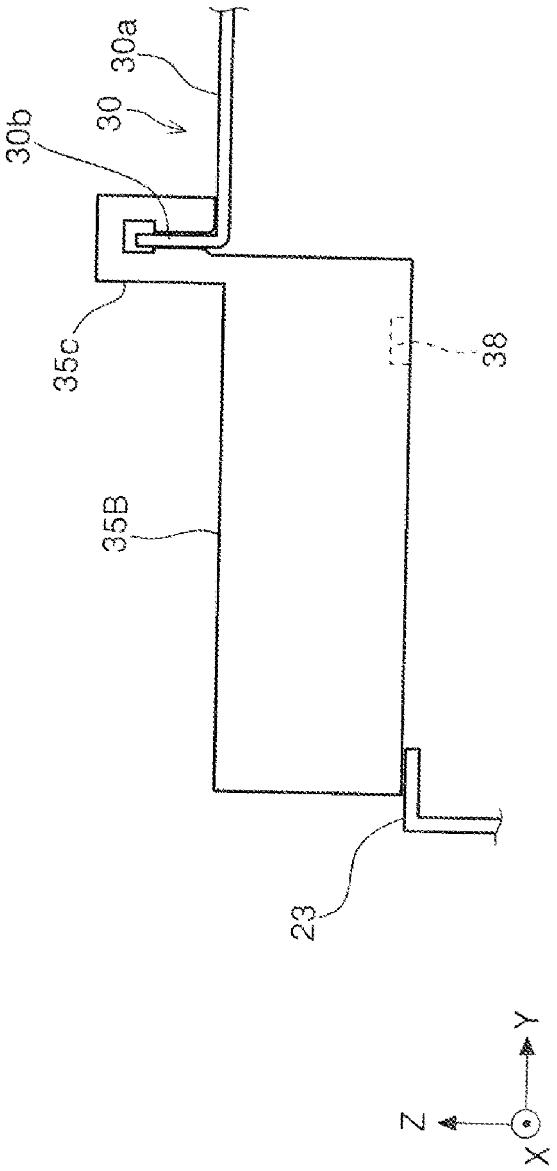
FIG. 32 is a diagram illustrating another embodiment of the rotation stopping structure for the wiper carriage.

In addition, the rotation stopping structure of the wiper carriage can be modified in a manner as illustrated in FIG. 32. A sub-frame 23 is provided under an end portion, at the −Y direction, of the wiper carriage 35B illustrated in FIG. 32. The sub-frame 23 extends over the entire movement region of the wiper carriage 35.

The sub-frame 23 supports, from below, the end portion, at the −Y direction, of the wiper carriage 35B. With this configuration, rotation of the wiper carriage 35B is stopped, and the posture of the wiper carriage 35B is defined.

Figure 33:
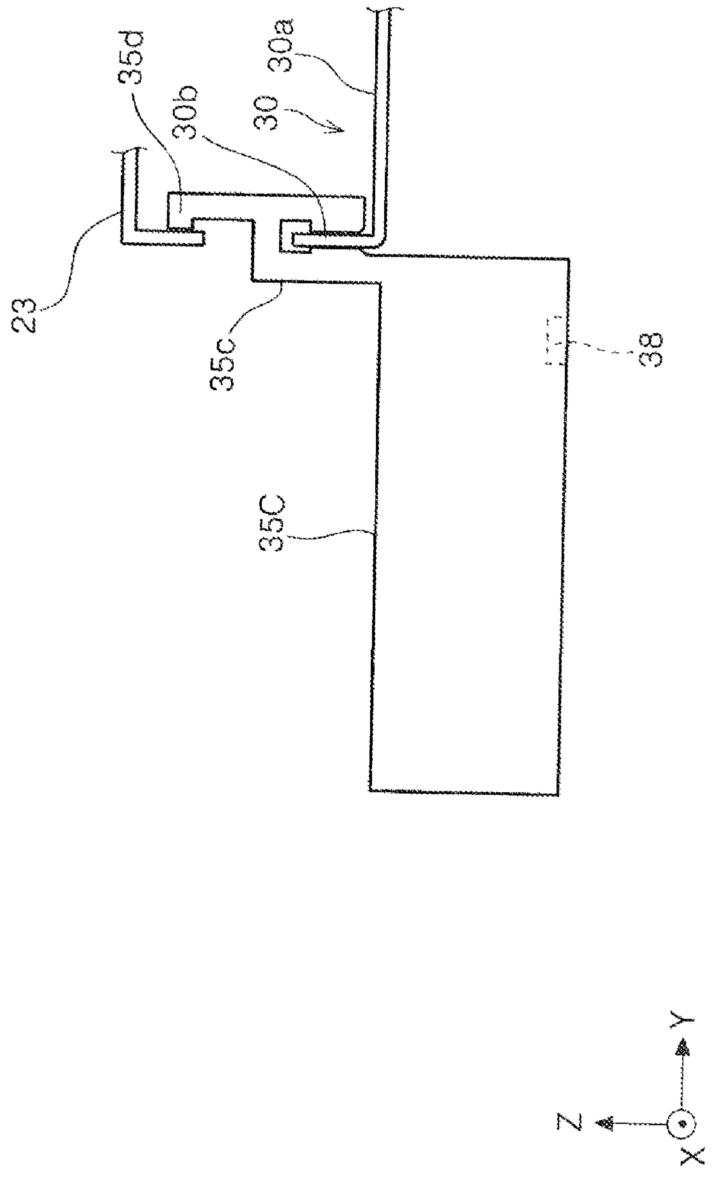
FIG. 33 is a diagram illustrating another embodiment of the rotation stopping structure for the wiper carriage.

Furthermore, the rotation stopping structure of the wiper carriage can be modified in a manner as illustrated in FIG. 33. In a wiper carriage 35C illustrated in FIG. 33, the rotation stopping section 35*d* is formed so as to extend in the +Z direction from the guiding target section 35*c*.

The sub-frame 23 is provided above the guiding target section 35*c*. The rotation stopping section 35*d* comes into contact with the sub-frame 23 in a pressing manner. This stops rotation of the wiper carriage 35C, and the posture of the wiper carriage 35C is defined.

Figure 34:
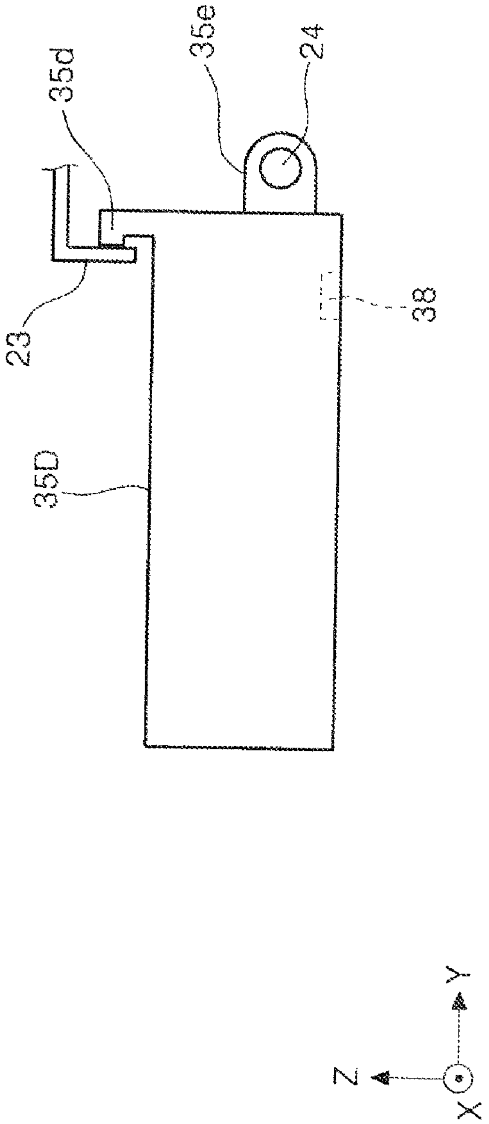
FIG. 34 is a diagram illustrating another embodiment of the rotation stopping structure for the wiper carriage.

In addition, the rotation stopping structure of the wiper carriage can be modified in a manner as illustrated in FIG. 34. A shaft insertion section 35*e* is formed at a wiper carriage 35D illustrated in FIG. 34. A guide shaft 24 is inserted into the shaft insertion section 35*e*. The guide shaft 24 extends over the entire movement region of the wiper carriage 35. The wiper carriage 35D is guided by the guide shaft 24 in the X-axis direction.

The sub-frame 23 is provided above the wiper carriage 35D. The rotation stopping section 35*d* comes into contact with the sub-frame 23 in a pressing manner. This stops rotation of the wiper carriage 35D, and the posture of the wiper carriage 35D is defined.

It is needless to say that the present disclosure is not limited to the embodiments described above or modification examples, and various modifications are possible within the scope of the present disclosure as described in the appended claims, which also fall within the scope of the present disclosure.

What is claimed is:

1. A recording device comprising:

a liquid discharging head configured to discharge a liquid to a medium to perform recording;

an opposing section disposed opposed to the liquid discharging head and including an opening portion formed at a position opposed to the liquid discharging head;

a cap section disposed at an inside of the opening portion and configured to cover a liquid discharging surface of the liquid discharging head; and a shutter configured to be displaced into a shielding position at which the opening portion is shielded and an open position at which the opening portion is opened, the shutter being configured to support a medium passing through a position opposed to the liquid discharging head when the shutter is disposed at the shielding position, the shutter includes a plurality of first ribs extending in a medium transport direction and are provided spaced apart from each other along a width direction intersecting the medium transport direction, the plurality of first ribs extend upwardly from a body of the shutter, the body and the plurality of first ribs of the shutter overlapping the cap section in the shielding position, wherein the liquid discharging head includes a plurality of head chips including a nozzle configured to discharge a liquid, the head chips are arranged alternately at an upstream position and a downstream position along a medium width direction, the medium width direction being a direction intersecting a medium transport direction, the opening portion is formed opened alternately at an upstream position and a downstream position along the medium width direction and corresponding to the arrangement of the plurality of head chips, and the opposing section includes a support portion disposed between two of the plurality of head chips adjacent in the medium width direction and configured to support the shutter disposed at the shielding position.

2. The recording device according to claim 1, wherein the support portion includes:

a first support portion extending from upstream toward downstream in the medium transport direction; and a second support portion extending from downstream toward upstream in the medium transport direction.

3. The recording device according to claim 2, wherein the opposing section includes the support portion between every two of the head chips adjacent in the medium width direction.

4. The recording device according to claim 2, wherein the open position of the shutter is disposed downstream of the shielding position in the medium transport direction and a corner portion of the first support portion at a downstream end in the medium transport direction has a chamfered shape or a rounded shape.

5. The recording device according to claim 1, wherein the opposing section includes a plurality of second ribs extending in the medium transport direction, provided upstream of the shutter in the medium transport direction, and spaced apart from each other along the width direction and when the shutter is disposed at the shielding position, the plurality of first ribs and the plurality of second ribs are continuous with each other along the medium transport direction.

6. The recording device according to claim 5, wherein corner portions of the first ribs at an upstream end in the medium transport direction have a chamfered shape or a rounded shape.

7. The recording device according to claim 1, wherein the open position of the shutter is disposed downstream of the shielding position in the medium transport direction, a transport roller pair configured to transport the medium is provided downstream, in the medium transport direction, of a position opposed to the liquid discharging head, and the shutter disposed at the open position is disposed under the transport roller pair.

8. The recording device according to claim 7, wherein the transport roller pair includes:

a driven roller configured to come into contact with a first surface of the medium opposed to the liquid discharging head and a driving roller configured to come into contact with a second surface on an opposite side of the first surface.

9. A recording device comprising:

a liquid discharging head configured to discharge a liquid to a medium to perform recording;

an opposing section disposed opposed to the liquid discharging head and including an opening portion formed at a position opposed to the liquid discharging head;

a cap section disposed at an inside of the opening portion and configured to cover a liquid discharging surface of the liquid discharging head; and a shutter configured to be displaced into a shielding position at which the opening portion is shielded and an open position at which the opening portion is opened, the shutter being configured to support a medium passing through a position opposed to the liquid discharging head when the shutter is disposed at the shielding position, wherein the liquid discharging head includes a plurality of head chips including a nozzle configured to discharge a liquid, the head chips are arranged alternately at an upstream position and a downstream position along a medium width direction, the medium width direction being a direction intersecting a medium transport direction, the opening portion is formed opened alternately at an upstream position and a downstream position along the medium width direction and corresponding to the arrangement of the plurality of head chips, and the opposing section includes a support portion disposed between two of the plurality of head chips adjacent in the medium width direction and configured to support the shutter disposed at the shielding position, wherein the shutter is configured to move along a guide path that comprises (i) a first portion that extends downstream from an upstream end in a medium transport direction and parallel along the medium transport direction, (ii) a second portion that slopes downward and downstream, and (iii) a third portion that extend parallel along the medium transport direction.

* * * * *